US011633680B2

(12) United States Patent
Simonelli et al.

(10) Patent No.: US 11,633,680 B2
(45) Date of Patent: Apr. 25, 2023

(54) BAR SCREEN FILTER APPARATUS AND METHOD

(71) Applicant: PARKSON CORPORATION, Fort Lauderdale, FL (US)

(72) Inventors: James K. Simonelli, Orlando, FL (US); Walter B. Stanek, Memphis, TN (US)

(73) Assignee: PARKSON CORPORATION, Ft. Lauderdale, FL (US)

( * ) Notice: Subject to any disclaimer, the term of this patent is extended or adjusted under 35 U.S.C. 154(b) by 169 days.

(21) Appl. No.: 16/936,669

(22) Filed: Jul. 23, 2020

(65) Prior Publication Data

US 2022/0023779 A1    Jan. 27, 2022

(51) Int. Cl.
| | |
|---|---|
| *B01D 29/64* | (2006.01) |
| *B01D 29/03* | (2006.01) |
| *B01D 29/44* | (2006.01) |
| *C02F 1/00* | (2006.01) |

(52) U.S. Cl.
CPC ......... *B01D 29/6484* (2013.01); *B01D 29/03* (2013.01); *B01D 29/445* (2013.01); *C02F 1/004* (2013.01); *B01D 2029/033* (2013.01); *C02F 2303/16* (2013.01)

(58) Field of Classification Search
None
See application file for complete search history.

(56) References Cited

U.S. PATENT DOCUMENTS

| | | | | |
|---|---|---|---|---|
| 317,366 | A * | 5/1885 | Jaeger | E03F 5/14 210/162 |
| 332,790 | A * | 12/1885 | Crisman | E02B 8/026 210/159 |
| 414,887 | A * | 11/1889 | Rakes et al. | E02B 8/026 210/159 |
| 419,887 | A * | 1/1890 | Robinson | B01D 29/035 210/162 |
| 452,595 | A * | 5/1891 | Correll | B01D 29/035 210/162 |
| 452,702 | A * | 5/1891 | Grabill | B01D 21/0012 210/160 |
| 454,185 | A * | 6/1891 | Robinson | B01D 29/035 210/162 |
| 495,023 | A * | 4/1893 | Correll | E02B 8/026 210/159 |

(Continued)

OTHER PUBLICATIONS

PARKSON Aqua Caiman®Vertical, undated, two pages; downloaded Dec. 8, 2022. (Year: 2022).*

*Primary Examiner* — Robert J Popovics
(74) *Attorney, Agent, or Firm* — Tarolli, Sundheim, Covell & Tummino LLP

(57) ABSTRACT

An apparatus for removing debris from water in a channel includes a bar screen assembly having a plurality of spaced apart, elongated filter bars arranged in a parallel relationship. A continuous conveyor carries a plurality of rakes. Each rake includes a plurality of spaced-apart tines interdigitated with the filter bars as the rake is moved along the filter bars by the conveyor to remove debris from the bar screen assembly. A conveyor belt retaining system includes at least one guide engaging an upstream side of an inner run of the conveyor and a counterweight connected to the at least one guide for biasing the inner run in a downstream direction.

13 Claims, 14 Drawing Sheets

(56) References Cited

U.S. PATENT DOCUMENTS

| | | | | |
|---|---|---|---|---|
| 623,828 A * | 4/1899 | Riensch | E03F 5/14 | 210/159 |
| 658,196 A * | 9/1900 | Whitney | B01D 33/04 | 210/160 |
| 672,799 A * | 4/1901 | Mcmeans | B65G 19/265 | 210/162 |
| 674,017 A * | 5/1901 | Riensch | E02B 8/026 | 210/159 |
| 677,567 A * | 7/1901 | Freeman | B01D 33/04 | 210/160 |
| 710,804 A * | 10/1902 | Riel | B01D 29/035 | 210/162 |
| 819,720 A * | 5/1906 | Brunotte | B01D 33/04 | 210/160 |
| 838,564 A * | 12/1906 | Murphy | E02B 1/003 | 210/162 |
| 905,158 A * | 12/1908 | Dugas et al. | B01D 21/245 | 210/159 |
| 960,613 A * | 6/1910 | Wunder | E03F 5/14 | 210/162 |
| 986,231 A * | 3/1911 | Sloan | B01D 29/035 | 210/162 |
| 1,143,496 A * | 6/1915 | Briles | E02B 1/006 | 210/162 |
| 1,150,445 A * | 8/1915 | Matheson | E03F 5/14 | 210/162 |
| 1,180,798 A * | 4/1916 | Spoon | B01D 29/035 | 210/162 |
| 1,207,376 A * | 12/1916 | Davidson | B01D 33/04 | 210/328 |
| 1,208,655 A * | 12/1916 | Reynolds | B01D 33/04 | 210/160 |
| 1,213,624 A * | 1/1917 | Glenn | E03F 5/14 | 210/162 |
| 1,252,617 A * | 1/1918 | Reoua | B01D 17/0214 | 210/160 |
| 1,264,990 A * | 5/1918 | Stephens | B01D 33/15 | 210/159 |
| 1,331,935 A * | 2/1920 | Lee | E02B 8/026 | 210/159 |
| 1,357,499 A * | 11/1920 | Hunt | E02B 8/026 | 210/162 |
| 1,392,647 A * | 10/1921 | Jones | E02B 8/026 | 210/159 |
| 1,417,205 A * | 5/1922 | Roddy | E02B 8/026 | 210/328 |
| 1,420,283 A * | 6/1922 | Randlett | E02B 8/026 | 210/162 |
| 1,426,217 A * | 8/1922 | Roddy | | 210/160 |
| 1,429,629 A * | 9/1922 | Randlett | E02B 8/026 | 210/162 |
| 1,435,770 A * | 11/1922 | Welser | B01D 33/04 | 210/160 |
| 1,512,028 A * | 10/1924 | Johnson | B01D 29/23 | 210/162 |
| 1,514,673 A * | 11/1924 | Roddy | B01D 33/327 | 210/328 |
| 1,529,602 A * | 3/1925 | Maine | E02B 8/026 | 210/159 |
| 1,585,461 A * | 5/1926 | Brackett | B01D 33/04 | 210/160 |
| 1,592,708 A * | 7/1926 | Roddy | B01D 33/056 | 210/160 |
| 1,593,169 A * | 7/1926 | Geiger | B01D 33/333 | 210/160 |
| 1,606,546 A * | 11/1926 | Wallene | B01D 33/327 | 405/75 |
| 1,629,572 A * | 5/1927 | Geiger | B01D 33/04 | 210/160 |
| 1,640,653 A * | 8/1927 | Geiger | B01D 33/04 | 210/160 |
| 1,673,534 A * | 6/1928 | Saaler | E02B 8/023 | 210/162 |
| 1,708,817 A * | 4/1929 | Winger | E02B 8/026 | 210/162 |
| 1,710,605 A * | 4/1929 | Bole | B01D 33/327 | 210/160 |
| 1,716,376 A * | 6/1929 | Geiger | B01D 33/048 | 210/160 |
| 1,732,649 A * | 10/1929 | Hobart | B01D 33/327 | 210/160 |
| 1,768,314 A * | 6/1930 | Folta | B01D 35/147 | 210/162 |
| 1,781,223 A * | 11/1930 | Gary | B01D 33/04 | 210/160 |
| 1,786,973 A * | 12/1930 | Webber | D21D 5/02 | 210/345 |
| 1,794,504 A * | 3/1931 | Van Norman | E02B 8/026 | 210/162 |
| 1,799,457 A * | 4/1931 | Cuttle | E02B 1/006 | 210/162 |
| 1,801,111 A * | 4/1931 | Schoefield | E02B 8/026 | 210/159 |
| 1,815,137 A * | 7/1931 | Bleyer | B01D 33/327 | 210/328 |
| 1,823,823 A * | 9/1931 | Dundas | E02B 8/026 | 210/162 |
| 1,839,186 A * | 12/1931 | Leonard | E02B 8/026 | 210/162 |
| 1,856,381 A * | 5/1932 | Gary | | 210/328 |
| 1,861,031 A * | 5/1932 | Schmitt | E02B 3/04 | 405/35 |
| 1,864,359 A * | 6/1932 | Laughlin | B01D 33/275 | 198/802 |
| 1,874,125 A * | 8/1932 | Schofield | E02B 8/026 | 210/162 |
| 1,874,736 A * | 8/1932 | Bleyer | B01D 33/327 | 198/643 |
| 1,881,270 A * | 10/1932 | Evers | E02B 8/026 | 210/162 |
| 1,910,803 A * | 5/1933 | Leonard | E02B 8/026 | 210/162 |
| 1,910,860 A * | 5/1933 | Sayers | B01D 33/327 | 210/333.1 |
| 1,912,020 A * | 5/1933 | Steindorf | E02B 8/026 | 210/162 |
| 1,913,303 A * | 6/1933 | Bleyer | B01D 33/327 | 210/328 |
| 1,920,158 A * | 7/1933 | Albertson | E02B 8/026 | 210/159 |
| 1,925,251 A * | 9/1933 | Hobart | B01D 33/327 | 210/328 |
| 1,942,381 A * | 1/1934 | Benesh | B01D 33/463 | 239/524 |
| 1,959,491 A * | 5/1934 | Moran | B01D 29/6484 | 210/159 |
| 1,963,460 A * | 6/1934 | Bleyer | B01D 33/327 | 210/160 |
| 1,967,050 A * | 7/1934 | Brackett | B01D 33/327 | 210/160 |
| 1,984,891 A * | 12/1934 | Miick | E02B 8/026 | 210/162 |
| 1,992,005 A * | 2/1935 | Goldsborough | B01D 33/04 | 210/159 |
| 2,009,005 A * | 7/1935 | Schofield | E02B 8/026 | 210/159 |
| 2,020,728 A * | 11/1935 | Kinsey | E02B 8/026 | 210/159 |
| 2,033,653 A * | 3/1936 | Schlapak | E02B 8/026 | 210/162 |
| 2,068,428 A * | 1/1937 | Morehead | B01D 21/2405 | 210/526 |
| 2,071,670 A * | 2/1937 | Warner | E02B 8/085 | 210/154 |
| 2,086,821 A * | 7/1937 | Raisch | E02B 8/026 | 210/159 |

(56) References Cited

U.S. PATENT DOCUMENTS

| | | | | |
|---|---|---|---|---|
| 2,090,637 | A * | 8/1937 | Paige | E02B 8/026 210/162 |
| 2,092,623 | A * | 9/1937 | Kuster | E02B 8/026 210/162 |
| 2,095,504 | A * | 10/1937 | Kesti | A01K 69/00 210/160 |
| 2,102,570 | A * | 12/1937 | Lind | E02B 8/026 210/162 |
| 2,106,851 | A * | 2/1938 | Nordell | B02C 18/0092 210/162 |
| 2,128,345 | A * | 8/1938 | Briggs | E02B 8/026 210/162 |
| 2,128,346 | A * | 8/1938 | Briggs | E02B 8/026 210/159 |
| 2,128,347 | A * | 8/1938 | Briggs | E02B 8/026 210/138 |
| 2,128,348 | A * | 8/1938 | Briggs | E02B 8/026 210/159 |
| 2,128,349 | A * | 8/1938 | Briggs | E02B 8/026 210/162 |
| 2,146,542 | A * | 2/1939 | Hawley | C02F 1/26 210/221.1 |
| 2,152,619 | A * | 3/1939 | Maher | E03B 3/04 210/488 |
| 2,162,325 | A * | 6/1939 | Briles | E02B 1/006 55/354 |
| 2,186,790 | A * | 1/1940 | Smyser | 210/162 |
| 2,198,943 | A * | 4/1940 | Lowe | E02B 1/006 210/162 |
| 2,286,332 | A * | 6/1942 | Bleyer | B01D 33/333 210/328 |
| 2,291,103 | A * | 7/1942 | Plummer | E02B 8/026 210/159 |
| 2,291,121 | A * | 7/1942 | Tolman | E02B 8/026 210/162 |
| 2,307,601 | A * | 1/1943 | Nichols | E02B 8/026 210/159 |
| 2,335,573 | A * | 11/1943 | Scott | E02B 8/026 210/159 |
| 2,358,841 | A * | 9/1944 | Walker | E03F 5/14 210/138 |
| 2,379,615 | A * | 7/1945 | Walker | B02C 18/0092 210/138 |
| 2,494,780 | A * | 1/1950 | Schmidt | E04D 13/0645 210/162 |
| 2,518,119 | A * | 8/1950 | Breda | E02B 8/026 172/26 |
| 2,524,304 | A * | 10/1950 | Breda | E02B 8/026 210/162 |
| 2,525,516 | A * | 10/1950 | Bergmann | E03F 7/10 198/643 |
| 2,634,863 | A * | 4/1953 | Hauer | E02B 8/026 210/162 |
| 2,647,085 | A * | 7/1953 | Tolman | 210/162 |
| 2,671,563 | A * | 3/1954 | Benner, Jr. | E02B 8/026 210/159 |
| 2,679,318 | A * | 5/1954 | Soldan | B07B 1/4609 209/393 |
| 2,684,157 | A * | 7/1954 | Tolman | E02B 8/026 210/159 |
| 2,691,324 | A * | 10/1954 | De Pan | D21B 1/345 210/159 |
| 2,696,308 | A * | 12/1954 | Martin | E02B 8/026 210/159 |
| 2,723,391 | A * | 11/1955 | Hailey | G05D 3/127 340/316 |
| 2,784,844 | A * | 3/1957 | Sturzenegger | E02B 8/026 210/162 |
| 2,804,209 | A * | 8/1957 | Eastling | B01D 33/327 210/194 |
| 2,823,802 | A * | 2/1958 | Massey | E02B 5/085 210/162 |
| 2,839,197 | A * | 6/1958 | Nordell | B07B 1/48 210/162 |
| 2,855,102 | A * | 10/1958 | Lannert | B02C 18/0092 210/159 |
| 2,866,555 | A * | 12/1958 | Nordell | B02C 18/0092 210/123 |
| 2,897,967 | A * | 8/1959 | Arthur | B02C 18/0092 210/159 |
| 2,899,062 | A * | 8/1959 | Heacock | B01D 33/333 210/97 |
| 2,904,181 | A * | 9/1959 | Baker | E02B 8/026 210/159 |
| 2,910,181 | A * | 10/1959 | Schade | E02B 8/026 210/162 |
| 2,918,171 | A * | 12/1959 | Nordell | E02B 8/026 210/159 |
| 2,930,485 | A * | 3/1960 | Nordell | E02B 8/023 210/162 |
| 2,963,156 | A * | 12/1960 | Nordell | E02B 8/026 210/138 |
| 2,978,105 | A * | 4/1961 | Poheim | E02B 8/026 210/159 |
| 3,018,893 | A * | 1/1962 | Collie | E02B 8/026 210/159 |
| 3,061,103 | A * | 10/1962 | Mitchell | E02B 13/00 210/162 |
| 3,093,578 | A * | 6/1963 | Hofmeister | B01D 33/327 210/328 |
| 3,093,580 | A * | 6/1963 | Siewert | E02B 8/026 210/162 |
| 3,144,406 | A * | 8/1964 | Crise | E02B 8/026 210/159 |
| 3,152,075 | A * | 10/1964 | Gross | E02B 8/026 210/159 |
| 3,190,448 | A * | 6/1965 | Johnston | E02B 8/026 210/162 |
| 3,193,104 | A * | 7/1965 | Leach | E02B 8/026 210/162 |
| 3,209,914 | A * | 10/1965 | Nordell | E02B 8/026 210/159 |
| 3,325,013 | A * | 6/1967 | Cyphers | E02B 8/026 210/159 |
| 3,347,382 | A * | 10/1967 | Quast | B01D 29/03 210/159 |
| 3,355,022 | A * | 11/1967 | Nordell | B01D 29/01 210/162 |
| 3,358,837 | A * | 12/1967 | Tillett | E02B 8/026 210/159 |
| 3,464,558 | A * | 9/1969 | Harvanek | B07B 13/05 210/159 |
| 3,482,698 | A * | 12/1969 | Ostnas Lars-Olof | E02B 8/026 210/159 |
| 3,549,028 | A * | 12/1970 | Neumann | E02B 8/026 414/397 |
| 3,591,006 | A * | 7/1971 | Daferner | E02B 8/026 210/159 |
| 3,615,012 | A * | 10/1971 | Verbandt | E02B 8/026 210/159 |
| 3,802,565 | A * | 4/1974 | Hughes | B01D 35/28 210/160 |
| 3,836,463 | A * | 9/1974 | Teague | B02C 18/0092 210/162 |
| 3,856,678 | A * | 12/1974 | Hagihara | E02B 8/026 210/160 |
| 3,868,324 | A * | 2/1975 | Taylor | B01D 33/333 210/333.1 |
| 3,909,411 | A * | 9/1975 | Angele | E02B 8/026 210/162 |
| 3,975,275 | A * | 8/1976 | Kato | B01D 29/03 210/160 |
| 4,040,952 | A * | 8/1977 | Jopp | B01D 33/333 198/848 |
| 4,064,048 | A * | 12/1977 | Downs | A01K 79/02 210/160 |
| 4,081,374 | A * | 3/1978 | Forshee | B01D 35/28 210/162 |

(56) References Cited

U.S. PATENT DOCUMENTS

| | | | | |
|---|---|---|---|---|
| 4,107,040 A | * | 8/1978 | Rudolph | B01D 29/6484 210/159 |
| 4,138,334 A | * | 2/1979 | Rimmele | E02B 8/026 210/159 |
| 4,138,340 A | * | 2/1979 | Suzuki | B65G 15/52 198/698 |
| 4,184,957 A | * | 1/1980 | Botsch | E02B 8/026 210/159 |
| 4,186,091 A | * | 1/1980 | Sutton | B01D 33/50 210/160 |
| 4,188,294 A | * | 2/1980 | Hagihara | B01D 33/275 210/328 |
| 4,214,989 A | * | 7/1980 | Rudolph | E02B 8/026 210/159 |
| 4,218,319 A | * | 8/1980 | Hansson | B01D 29/01 210/159 |
| 4,221,390 A | * | 9/1980 | Bainbridge | B01D 33/067 210/160 |
| 4,222,878 A | * | 9/1980 | Hansson | B01D 29/01 210/159 |
| 4,229,301 A | * | 10/1980 | Roberts | B01D 35/28 210/159 |
| 4,247,397 A | * | 1/1981 | Dobosi | B01D 35/28 210/162 |
| 4,253,952 A | * | 3/1981 | Grebb | B01D 29/6423 210/159 |
| 4,265,750 A | * | 5/1981 | Meunier | B01D 29/01 210/159 |
| 4,277,335 A | * | 7/1981 | Hori | E02B 8/026 210/159 |
| 4,289,619 A | * | 9/1981 | Sampson | B01D 29/03 210/159 |
| 4,295,534 A | * | 10/1981 | Zachmeier | E21B 21/065 198/817 |
| 4,302,331 A | * | 11/1981 | Condit, Jr. | B01D 33/327 210/160 |
| 4,323,451 A | * | 4/1982 | Hagihara | B01D 33/04 210/330 |
| 4,329,230 A | * | 5/1982 | Quin | B01D 29/01 210/159 |
| 4,353,797 A | * | 10/1982 | Verbandt | E02B 8/026 210/159 |
| 4,360,426 A | * | 11/1982 | Wetzel | B01D 33/333 210/160 |
| 4,374,736 A | * | 2/1983 | Jackson | B01D 33/04 210/160 |
| 4,392,952 A | * | 7/1983 | Fechter | E02B 8/026 210/162 |
| 4,396,511 A | * | 8/1983 | Neumann | E02B 8/026 210/159 |
| 4,415,462 A | * | 11/1983 | Finch | E02B 5/08 210/162 |
| 4,447,323 A | * | 5/1984 | Jackson | E02B 1/006 210/159 |
| 4,447,324 A | * | 5/1984 | Jackson | B01D 33/04 210/159 |
| 4,472,273 A | * | 9/1984 | Hagihara | B01D 29/01 210/162 |
| 4,518,494 A | * | 5/1985 | Jackson | E02B 8/026 210/159 |
| 4,521,306 A | * | 6/1985 | Day | E02B 8/026 210/159 |
| 4,541,930 A | * | 9/1985 | Heidler | E02B 8/085 210/232 |
| 4,561,975 A | * | 12/1985 | Schloss, Jr. | B01D 25/38 210/162 |
| 4,582,601 A | * | 4/1986 | Straw | B01D 33/327 210/232 |
| 4,597,864 A | * | 7/1986 | Wiesemann | B01D 33/275 210/160 |
| 4,642,195 A | * | 2/1987 | Nill | B01D 29/66 210/411 |
| 4,692,242 A | * | 9/1987 | Jackson | B01D 33/333 210/160 |
| 4,709,804 A | * | 12/1987 | Duperon | E02B 15/104 198/719 |
| 4,725,365 A | * | 2/1988 | Albrecht, III | E02B 8/026 210/791 |
| 4,725,366 A | * | 2/1988 | Dacus | E02B 8/026 210/791 |
| 4,780,199 A | * | 10/1988 | Ezzell | B01D 29/445 210/162 |
| 4,792,394 A | * | 12/1988 | Rudzinski | B01D 29/01 210/162 |
| 4,812,231 A | * | 3/1989 | Wiesemann | B01D 33/04 210/159 |
| 4,826,589 A | * | 5/1989 | Hirs | B01D 29/6484 210/162 |
| 4,846,966 A | * | 7/1989 | Pastore | E02B 1/00 210/488 |
| 4,851,114 A | * | 7/1989 | Minichello | B01D 29/445 210/162 |
| 4,853,116 A | * | 8/1989 | Wallander | B01D 29/445 210/104 |
| 4,857,182 A | * | 8/1989 | Jackson | B01D 29/445 210/138 |
| 4,892,652 A | * | 1/1990 | Rudy | B01D 33/333 210/160 |
| 4,917,796 A | * | 4/1990 | Rudzinski | B01D 29/6423 210/162 |
| 4,919,346 A | * | 4/1990 | Chambers, Sr. | B02C 18/0092 241/46.06 |
| 4,929,122 A | * | 5/1990 | Yoas | E02B 8/085 405/83 |
| 4,935,131 A | * | 6/1990 | Pindar | B01D 33/722 210/160 |
| 4,969,992 A | * | 11/1990 | Naappa | B01D 29/6484 210/162 |
| 5,013,430 A | * | 5/1991 | Mileson | E02B 8/026 210/162 |
| 5,032,262 A | * | 7/1991 | Wallander | E02B 8/026 210/162 |
| 5,032,263 A | * | 7/1991 | Rudzinski | B01D 29/6484 210/162 |
| 5,034,122 A | * | 7/1991 | Wiesemann | B01D 29/445 209/205 |
| 5,051,174 A | * | 9/1991 | Nungaray | B01D 29/014 210/162 |
| 5,059,313 A | * | 10/1991 | Etschel | B01D 33/275 210/392 |
| 5,060,872 A | * | 10/1991 | Chambers, Sr. | B07B 1/10 241/46.06 |
| 5,074,996 A | * | 12/1991 | Galanty | E02B 8/026 210/162 |
| 5,098,561 A | * | 3/1992 | Grabbe | E02B 8/026 210/162 |
| 5,102,536 A | * | 4/1992 | Wiesemann | B01D 33/463 210/159 |
| 5,167,803 A | * | 12/1992 | Newton | B01D 29/6484 210/162 |
| 5,171,436 A | * | 12/1992 | Botsch | E02B 8/026 210/162 |
| 5,242,583 A | * | 9/1993 | Thomas | B01D 33/056 160/369 |
| 5,246,573 A | * | 9/1993 | Lodholz | B01D 29/01 210/162 |
| 5,284,251 A | * | 2/1994 | Marrs | D21B 1/023 209/396 |
| 5,300,221 A | * | 4/1994 | Austevoll | B01D 33/04 210/159 |
| 5,320,286 A | * | 6/1994 | Chambers, Sr. | B07B 1/10 241/46.06 |
| 5,326,460 A | * | 7/1994 | Cheesman | B01D 33/333 210/160 |
| 5,333,801 A | * | 8/1994 | Chambers, Sr. | B02C 23/08 241/46.06 |
| 5,368,168 A | * | 11/1994 | Marrs | B07B 1/12 209/396 |

(56) References Cited

U.S. PATENT DOCUMENTS

| | | | | |
|---|---|---|---|---|
| 5,387,336 A * | 2/1995 | Bormet | B01D 33/461 | 210/160 |
| 5,387,337 A * | 2/1995 | Byers | B01D 33/04 | 210/159 |
| 5,392,930 A * | 2/1995 | Jones | B07B 13/16 | 209/394 |
| 5,392,931 A * | 2/1995 | Jones | D21B 1/023 | 209/394 |
| 5,407,563 A * | 4/1995 | Blake | B01D 33/463 | 210/402 |
| 5,415,766 A * | 5/1995 | Quick | B01D 33/333 | 210/160 |
| 5,419,832 A * | 5/1995 | Heinen | E02B 8/026 | 210/160 |
| 5,425,875 A * | 6/1995 | Duperon | B01D 29/6484 | 210/162 |
| 5,428,256 A * | 6/1995 | Schloss | B01D 29/01 | 210/159 |
| 5,456,826 A * | 10/1995 | Mellegard | E02B 8/026 | 210/162 |
| 5,468,376 A * | 11/1995 | Bates | E02B 8/026 | 210/232 |
| 5,476,179 A * | 12/1995 | Jones | B07B 1/12 | 209/396 |
| 5,489,378 A * | 2/1996 | Cheesman | B01D 33/808 | 210/90 |
| 5,501,793 A * | 3/1996 | Cheesman | E02B 1/006 | 210/160 |
| 5,534,140 A * | 7/1996 | Brummond | E02B 8/026 | 210/162 |
| 5,543,038 A * | 8/1996 | Johannessen | E03F 5/101 | 210/162 |
| 5,551,137 A * | 9/1996 | Davis | B01D 33/275 | 29/434 |
| 5,560,496 A * | 10/1996 | Lynn | B07B 13/16 | 209/674 |
| 5,565,093 A * | 10/1996 | Frankenberger | B01D 33/461 | 210/160 |
| 5,571,406 A * | 11/1996 | Mensching | B01D 29/6484 | 210/162 |
| 5,573,659 A * | 11/1996 | Johnson, Jr. | B01D 33/333 | 198/732 |
| 5,618,415 A * | 4/1997 | Johnson, Jr. | B01D 33/04 | 210/779 |
| 5,641,398 A * | 6/1997 | Huber | E03F 5/14 | 210/162 |
| 5,674,386 A * | 10/1997 | Filion | E03F 5/12 | 210/162 |
| 5,676,829 A * | 10/1997 | Cotterill | B01D 33/461 | 210/159 |
| 5,715,668 A * | 2/1998 | Filion | B01D 29/445 | 210/159 |
| 5,718,771 A * | 2/1998 | Cassell | E02B 8/026 | 210/791 |
| 5,730,862 A * | 3/1998 | Mahr | B01D 29/01 | 210/162 |
| 5,755,958 A * | 5/1998 | Huber | B01D 29/6476 | 210/162 |
| 5,770,055 A * | 6/1998 | Wallander | E02B 8/026 | 210/162 |
| 5,770,057 A * | 6/1998 | Filion | B01D 29/945 | 210/162 |
| 5,779,888 A * | 7/1998 | Bennett | B01D 29/05 | 210/170.03 |
| 5,788,839 A * | 8/1998 | Gargan, Jr. | B01D 33/333 | 210/160 |
| 5,795,467 A * | 8/1998 | Schloss | B01D 29/603 | 210/162 |
| 5,800,701 A * | 9/1998 | Larsen | B01D 33/461 | 210/791 |
| 5,840,180 A * | 11/1998 | Filion | B01D 29/6476 | 210/162 |
| 5,868,259 A * | 2/1999 | Bielagus | B07B 1/42 | 209/674 |
| 5,887,982 A * | 3/1999 | Wilcher | F16C 17/14 | 384/247 |
| 5,895,579 A * | 4/1999 | Schloss | E02B 8/04 | 210/162 |
| 5,901,857 A * | 5/1999 | Schurman | B07B 1/48 | 403/375 |
| 5,922,195 A * | 7/1999 | Pastore | B07B 1/4609 | 210/162 |
| 5,950,840 A * | 9/1999 | Thoma | D21B 1/023 | 209/314 |
| 5,968,350 A * | 10/1999 | Davignon | B01D 29/445 | 210/162 |
| 5,993,651 A * | 11/1999 | Wiesemann | E02B 8/026 | 210/197 |
| 6,003,682 A * | 12/1999 | Bielagus | D21D 5/16 | 209/394 |
| 6,006,922 A * | 12/1999 | Bielagus | D21B 1/023 | 209/396 |
| 6,010,013 A * | 1/2000 | Brauch | B01D 29/01 | 210/159 |
| 6,016,920 A * | 1/2000 | Brauch | E02B 8/026 | 210/159 |
| 6,019,892 A * | 2/2000 | Wilcher | B01D 29/6484 | 74/89.17 |
| 6,063,293 A * | 5/2000 | Schloss | B01D 29/445 | 210/791 |
| 6,086,757 A * | 7/2000 | Wilcher | B01D 29/445 | 74/DIG. 10 |
| 6,126,821 A * | 10/2000 | Corcoran | E03F 5/12 | 210/162 |
| 6,129,215 A * | 10/2000 | Brauch | B01D 29/6484 | 210/159 |
| 6,139,728 A * | 10/2000 | Huber | E02B 8/026 | 210/162 |
| 6,177,020 B1 * | 1/2001 | Wiesemann | B01D 33/275 | 210/791 |
| 6,187,184 B1 * | 2/2001 | Reetz | B01D 33/333 | 210/488 |
| 6,245,225 B1 * | 6/2001 | Giersberg | E02B 8/026 | 210/162 |
| 6,264,834 B1 * | 7/2001 | Bele | B01D 21/245 | 210/159 |
| 6,267,880 B1 * | 7/2001 | Jackson | B01D 33/333 | 210/232 |
| 6,280,612 B1 * | 8/2001 | Kroos | B01D 33/275 | 210/357 |
| 6,294,085 B1 * | 9/2001 | Bache | B01D 33/04 | 210/160 |
| 6,309,540 B1 * | 10/2001 | Chang | B01D 29/6484 | 210/162 |
| 6,409,915 B1 * | 6/2002 | Rusch | B01D 29/44 | 210/162 |
| 6,426,009 B1 * | 7/2002 | Meurer | B01D 29/03 | 210/791 |
| 6,467,997 B2 * | 10/2002 | Johnson | E02B 1/006 | 405/83 |
| 6,490,941 B1 * | 12/2002 | Hur | B01D 33/801 | 74/25 |
| 6,539,585 B1 * | 4/2003 | Anthony | D01B 1/04 | 19/48 R |
| 6,540,911 B1 * | 4/2003 | Bajema | B01D 29/925 | 210/162 |
| 6,579,450 B2 * | 6/2003 | Wilcher | B01D 29/6484 | 210/162 |
| 6,613,238 B2 * | 9/2003 | Schloss | B01D 35/02 | 210/791 |
| 6,666,977 B2 * | 12/2003 | Seidl | E02B 8/026 | 210/791 |
| 6,669,854 B1 * | 12/2003 | Wiesemann | B01D 33/275 | 210/791 |
| 6,679,994 B1 * | 1/2004 | Turco | E03F 5/12 | 210/791 |
| 6,709,578 B2 * | 3/2004 | Wilcher | B01D 33/801 | 210/232 |

(56) References Cited

U.S. PATENT DOCUMENTS

| | | | | |
|---|---|---|---|---|
| 6,719,898 B1* | 4/2004 | Marzluf | B01D 33/801 | 210/328 |
| 6,719,912 B2* | 4/2004 | Seidl | E02B 8/026 | 210/791 |
| 6,733,663 B1* | 5/2004 | Simon | B01D 29/94 | 134/115 R |
| 6,869,524 B1* | 3/2005 | Seidl | B01D 29/01 | 210/162 |
| 6,889,851 B1* | 5/2005 | Isola | D21C 7/00 | 209/687 |
| 6,896,820 B2* | 5/2005 | Mattox | B01D 29/445 | 210/791 |
| 6,913,690 B2* | 7/2005 | Mattox | B01D 29/03 | 210/159 |
| 6,942,789 B2* | 9/2005 | Wilcher | B01D 33/275 | 210/160 |
| 6,994,785 B2* | 2/2006 | Wilcher | B01D 33/04 | 210/232 |
| 7,014,754 B2* | 3/2006 | Wilcher | B01D 33/333 | 210/232 |
| 7,048,850 B2* | 5/2006 | DePaso | E02B 8/026 | 210/160 |
| 7,135,109 B2* | 11/2006 | Wilcher | B01D 33/801 | 210/160 |
| 7,144,500 B2* | 12/2006 | Rybar | B01D 21/34 | 210/159 |
| 7,147,784 B2* | 12/2006 | Seidl | B01D 29/6484 | 210/741 |
| 7,300,572 B2* | 11/2007 | DePaso | E02B 8/026 | 210/159 |
| 7,326,336 B2* | 2/2008 | Jackson | B01D 33/503 | 210/159 |
| 7,344,638 B2* | 3/2008 | Conroy | B01D 33/37 | 210/232 |
| 7,393,451 B2* | 7/2008 | Wunsch | B01D 33/056 | 49/490.1 |
| 7,416,658 B2* | 8/2008 | Hur | E02B 8/026 | 210/158 |
| 7,575,674 B2* | 8/2009 | Chang | B01D 33/333 | 210/159 |
| 7,722,762 B2* | 5/2010 | Zubair | E02B 8/026 | 210/160 |
| 7,771,589 B2* | 8/2010 | Kelly | B01D 33/04 | 210/158 |
| 7,776,212 B2* | 8/2010 | Wunsch | B01D 33/056 | 210/160 |
| 7,815,811 B1* | 10/2010 | Reiss, Jr. | B01D 29/6484 | 210/791 |
| 7,919,003 B2* | 4/2011 | Reiss, Jr. | E02B 5/085 | 210/162 |
| 7,972,503 B2* | 7/2011 | Wilcher | B01D 29/6484 | 210/162 |
| 8,016,013 B2* | 9/2011 | Horvath | E06B 9/54 | 160/393 |
| 8,075,787 B2* | 12/2011 | Reiss, Jr. | E02B 5/085 | 210/767 |
| 8,092,674 B2* | 1/2012 | Heil | B01D 33/333 | 210/160 |
| 8,500,997 B2* | 8/2013 | Grammelsberger | E02B 8/026 | 210/160 |
| 8,591,746 B2* | 11/2013 | Fillon | B01D 35/147 | 210/741 |
| 8,753,506 B2* | 6/2014 | Kim | B01D 33/50 | 210/330 |
| 8,887,925 B2* | 11/2014 | Motakef | B01D 29/44 | 210/788 |
| 8,955,539 B2* | 2/2015 | Early | E03F 5/22 | 210/170.03 |
| 8,980,061 B2* | 3/2015 | Vinje | D21C 7/14 | 162/251 |
| 9,206,572 B2* | 12/2015 | Heil | B01D 33/333 | |
| 9,567,719 B2* | 2/2017 | Doyle | E02B 8/026 | |
| 9,636,607 B2* | 5/2017 | Mueller | B01D 21/245 | |
| 9,649,581 B2* | 5/2017 | Conroy | B01D 33/801 | |
| 9,707,496 B2* | 7/2017 | Duperon | B01D 29/66 | |
| 9,908,067 B2* | 3/2018 | Wright | B01D 21/2433 | |
| 9,975,069 B2* | 5/2018 | Frankenberger | B01D 33/048 | |
| 10,087,579 B2* | 10/2018 | Ottosson | D21C 7/08 | |
| 10,112,131 B2* | 10/2018 | Yoon | B01D 33/333 | |
| 10,124,372 B2* | 11/2018 | Linke | C21D 6/004 | |
| 10,226,721 B2* | 3/2019 | Reiss, Jr. | E02B 8/026 | |
| 10,258,907 B2* | 4/2019 | Rong | E03F 5/14 | |
| 10,648,165 B1* | 5/2020 | Friezner | G01N 1/18 | |
| 10,648,166 B2* | 5/2020 | Abt | E03F 5/14 | |
| 10,889,952 B2* | 1/2021 | Simonelli | E02B 8/026 | |
| 11,260,325 B2* | 3/2022 | Dai | C02F 1/004 | |
| 2002/0102135 A1* | 8/2002 | Johnson | E02B 1/006 | 405/81 |
| 2002/0113026 A1* | 8/2002 | Seidl | B01D 29/445 | 210/162 |
| 2002/0139734 A1* | 10/2002 | Hur | B01D 33/0166 | 210/159 |
| 2003/0070970 A1* | 4/2003 | Wilcher | E02B 8/026 | 210/159 |
| 2003/0080035 A1* | 5/2003 | Wilcher | B01D 33/801 | 210/160 |
| 2003/0132149 A1* | 7/2003 | Seidl | E02B 8/026 | 210/159 |
| 2003/0150785 A1* | 8/2003 | Fraud | E02B 8/026 | 210/159 |
| 2003/0155286 A1* | 8/2003 | Wilcher | B01D 33/275 | 210/160 |
| 2003/0183563 A1* | 10/2003 | Wilcher | E02B 8/026 | 210/159 |
| 2003/0189015 A1* | 10/2003 | Kaltchev | E02B 8/026 | 210/791 |
| 2003/0230520 A1* | 12/2003 | Cummings | B01D 29/6484 | 210/162 |
| 2004/0112810 A1* | 6/2004 | Frommann | E02B 8/026 | 210/159 |
| 2004/0112845 A1* | 6/2004 | Mattox | B01D 29/01 | 210/791 |
| 2004/0245159 A1* | 12/2004 | Rybar | B01D 21/04 | 210/143 |
| 2005/0000918 A1* | 1/2005 | Burgess | B07B 1/4609 | 210/791 |
| 2005/0016908 A1* | 1/2005 | Kerl | E02B 8/026 | 210/160 |
| 2005/0224199 A1* | 10/2005 | Mickelat | D21D 5/16 | 209/408 |
| 2005/0230294 A1* | 10/2005 | Seidl | B01D 33/333 | 210/160 |
| 2005/0279681 A1* | 12/2005 | Wilcher | B01D 33/275 | 210/160 |
| 2006/0032798 A1* | 2/2006 | DePaso | E02B 8/085 | 210/170.11 |
| 2006/0037897 A1* | 2/2006 | Jackson | E02B 8/026 | 210/159 |
| 2006/0201859 A1* | 9/2006 | DePaso | E02B 8/085 | 210/160 |
| 2007/0017858 A1* | 1/2007 | Zubair | E02B 8/026 | 210/160 |
| 2007/0090031 A1* | 4/2007 | Rybar | E02B 8/026 | 210/523 |
| 2007/0102334 A1* | 5/2007 | Wilcher | B01D 29/445 | 210/162 |
| 2007/0125691 A1* | 6/2007 | Reiss | B01D 29/445 | 210/159 |
| 2007/0163928 A1* | 7/2007 | Chang | B01D 33/333 | 209/660 |
| 2007/0193697 A1* | 8/2007 | Horvath | E06B 9/54 | 160/23.1 |
| 2007/0215532 A1* | 9/2007 | Wunsch | B01D 33/056 | 210/160 |
| 2007/0215539 A1* | 9/2007 | Conroy | B01D 33/37 | 210/232 |
| 2007/0241039 A1* | 10/2007 | Wilcher | B01D 33/333 | 210/160 |

(56) References Cited

U.S. PATENT DOCUMENTS

| | | | | |
|---|---|---|---|---|
| 2007/0246412 | A1* | 10/2007 | Hur | B01D 21/245 210/357 |
| 2008/0105608 | A1* | 5/2008 | Burgess | B01D 29/6484 210/405 |
| 2008/0116151 | A1* | 5/2008 | Suthard | E03F 5/14 210/791 |
| 2010/0006240 | A1* | 1/2010 | Cieslik | E06B 9/322 160/405 |
| 2011/0049039 | A1* | 3/2011 | Duperon | B01D 29/684 210/328 |
| 2011/0068052 | A1* | 3/2011 | Zollner | B07B 1/12 209/393 |
| 2011/0094957 | A1* | 4/2011 | Conroy | B01D 33/333 210/232 |
| 2011/0129630 | A1* | 6/2011 | Reiss, Jr. | E02B 5/085 428/34.1 |
| 2011/0139693 | A1* | 6/2011 | Frankenberger | E02B 8/026 210/160 |
| 2011/0139703 | A1* | 6/2011 | Grammelsberger | E02B 8/026 210/400 |
| 2011/0315623 | A1* | 12/2011 | Motakef | B01D 29/44 210/499 |
| 2012/0261353 | A1* | 10/2012 | Phillips | E03F 5/14 210/747.1 |
| 2013/0032548 | A1* | 2/2013 | Heil | E02B 8/026 210/160 |
| 2015/0020989 | A1* | 1/2015 | Vinje | D21C 7/00 162/251 |
| 2015/0027943 | A1* | 1/2015 | Bernier | B01D 29/445 210/330 |
| 2015/0182881 | A1* | 7/2015 | Wright | B01D 21/2444 210/324 |
| 2016/0096126 | A1* | 4/2016 | Frankenberger | B01D 33/056 210/160 |
| 2016/0296863 | A1* | 10/2016 | Dill | B01D 29/6484 |
| 2016/0339367 | A1* | 11/2016 | Spenger | B01D 29/445 |
| 2016/0368024 | A1* | 12/2016 | Linke | B07B 1/4618 |
| 2017/0050126 | A1* | 2/2017 | Rong | B07B 1/12 |
| 2017/0209819 | A1* | 7/2017 | Bernier | B01D 33/801 |
| 2017/0284022 | A1* | 10/2017 | Ottosson | D21C 7/14 |
| 2018/0353878 | A1* | 12/2018 | Duperon | B01D 29/684 |
| 2019/0085550 | A1* | 3/2019 | Abt | E03F 5/14 |
| 2019/0336894 | A1* | 11/2019 | Heil | B01D 33/333 |
| 2020/0149239 | A1* | 5/2020 | Simonelli | B01D 29/445 |
| 2022/0023779 | A1* | 1/2022 | Simonelli | C02F 1/004 |
| 2022/0118382 | A9* | 4/2022 | Duperon | B01D 29/6484 |

* cited by examiner

BAR SCREEN FILTER APPARATUS AND METHOD

TECHNICAL FIELD

The present invention relates to water filtration and, more specifically, relates to a rake belt retaining system for a wastewater bar screening machine.

BACKGROUND

Bar screen filters are used in the capturing of debris/material entrained in a liquid stream. There are two primary applications—screening wastewater from a municipal or industrial facility and screening water intakes to a fresh water facility or industrial facility. Collected debris can be removed from the bar screen by passing a scraper or a rake over the upstream side of the bars, pulling the debris to the surface for disposal.

The bar screen machine typically extends vertically at an angle of about 60° to 80° with respect to the horizontal. At these angles, gravity assists with the engagement of the rakes into the bar rack and with the removal of collected screenings from the rakes at the discharge point. When the angle is greater, however, gravity is less effective in accomplishing these tasks.

SUMMARY

In one example, an apparatus for removing debris from water in a channel includes a bar screen assembly having a plurality of spaced apart, elongated filter bars arranged in a parallel relationship. A continuous conveyor carries a plurality of rakes. Each rake includes a plurality of spaced-apart tines interdigitated with the filter bars as the rake is moved along the filter bars by the conveyor to remove debris from the bar screen assembly. A conveyor belt retaining system includes at least one guide engaging an upstream side of an inner run of the conveyor and a counterweight connected to the at least one guide for biasing the inner run in a downstream direction.

In another example, an apparatus for removing debris from water in a channel includes a bar screen assembly having a plurality of spaced apart, elongated filter bars arranged in a parallel relationship. A continuous conveyor carries a plurality of rakes. Each rake includes a plurality of spaced-apart tines interdigitated with the filter bars as the rake is moved along the filter bars by the conveyor to remove debris from the bar screen assembly. A deflection plate extends into the conveyor for pushing debris on the rake towards the tines. The deflection plate has an initial condition pivoted towards the rakes and is pivoted in an upstream direction to a retracted condition in response to upward movement of the conveyor.

Other objects and advantages and a fuller understanding of the invention will be had from the following detailed description and the accompanying drawings.

DETAILED DESCRIPTION

Figure 1A:
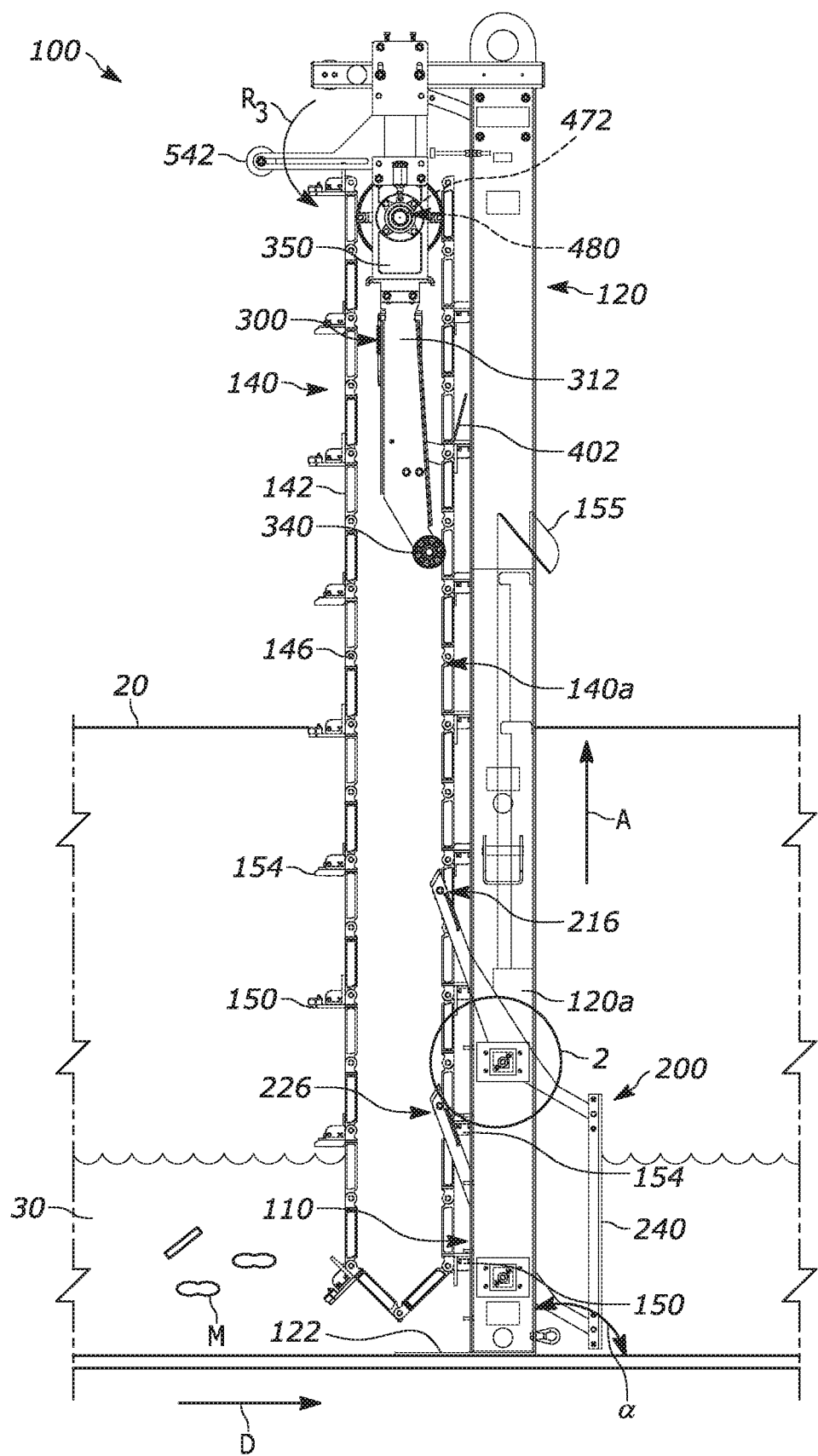
FIG. 1A is a schematic illustration of an example bar screen machine including a bar screen assembly.
Figure 1B:
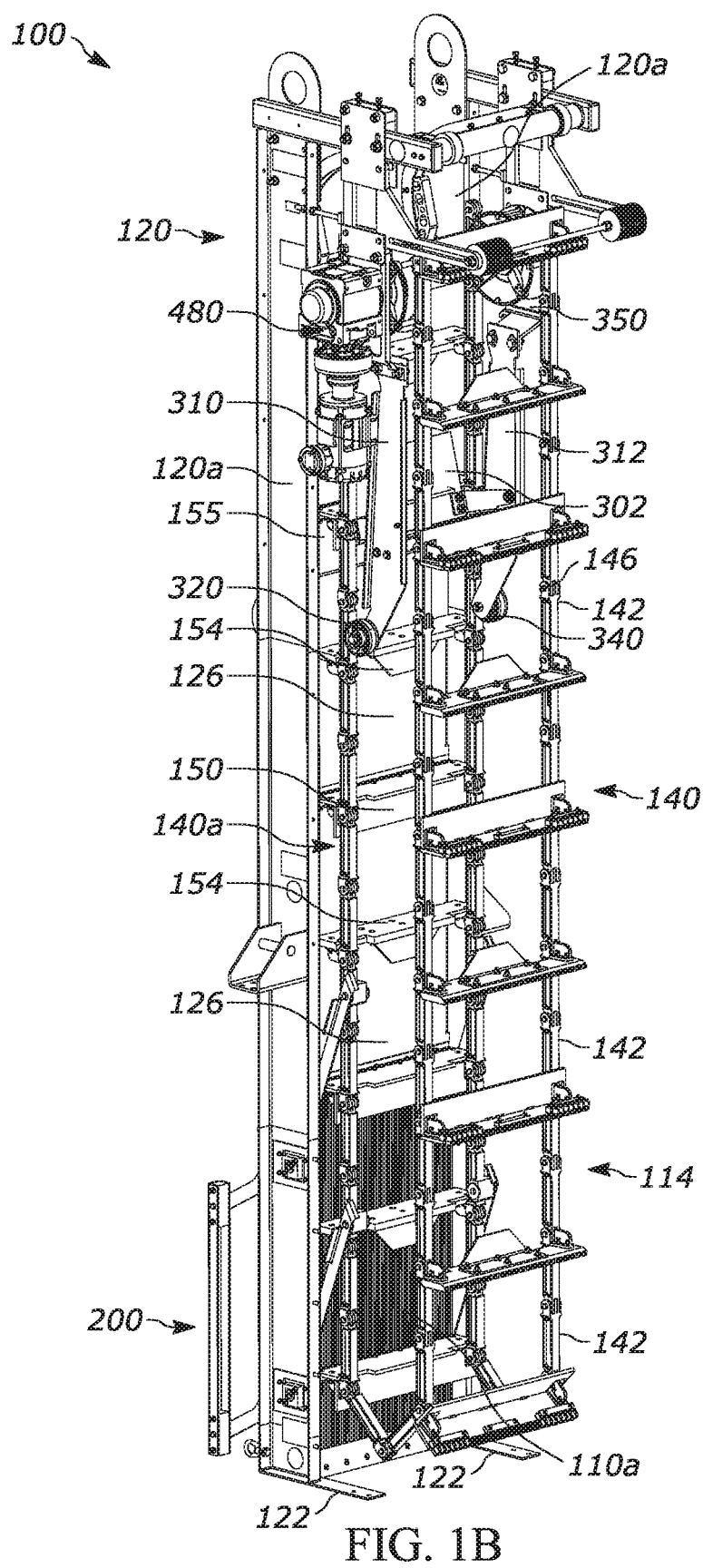
FIG. 1B is another schematic illustration of the bar screen machine of FIG. 1A.

The present invention relates to water filtration and, more specifically, relates to a rake belt retaining system for a wastewater bar screen machine. For some applications, the bar screen machine can be referred to as a headworks. An example bar screen or filter machine 100 is illustrated in FIGS. 1A-1B and includes a bar screen assembly 110 and an articulated bar screen cleaning apparatus 114. The bar screen machine 100 is typically placed at the intake of a wastewater treatment facility or a municipal water treatment facility to filter or screen the incoming water stream by removing debris, etc., which could damage downstream pumps if the debris were allowed to enter a pump intake (not shown).

It should be noted here that the terms "filter" and "screen", as well as "filtering" and "screening" shall be used interchangeably in this description. As indicated above, the machine 100 includes what the industry terms as a "bar screen". The term "screening" implies a device or filter that is intended to block large debris. In any event, a "bar screen" does perform a "filtering" function, and, therefore, the terms "filter" and "screen" can be used interchangeably herein.

The bar screen machine 100 includes a frame 120 having a pair of upstanding frame members 120a extending vertically from a base or feet 122. The feet 122 help to rigidly attach the bar screen machine 100 within a channel or duct 20 that conveys water 30 to be treated to pumps (not shown) in a downstream direction D from the machine 100. The feet 122 extend at an angle α relative to the frame members 120a. In one example, the angle α can be greater than about 80°. In another example, the angle α can be 90° or substantially 90°.

The bar screen assembly 110 is located at the lower end of the bar screen machine 100 adjacent the feet 122. The bar screen assembly 110 includes spaced-apart, parallel filter bars 110a mounted between the frame members 120a and extending generally parallel thereto. The bar screen assembly 110 can extend to a position above or below that shown in FIG. 1B. The vertical extent of the bar screen assembly 110 is determined by the water 30 level in the channel or duct 20. In any case, the filter bars 110a extend at the angle a relative to the feet 122 and, thus, extend at the angle a relative to the bottom of the channel 20.

In any case, rigid, solid plates 126, which may be termed "dead plates", are mounted to the frame members 120a above the bar screen assembly 110. The dead plates 126 help to prevent water 30 from by passing the bar screen assembly 110 should the water level in the duct 20 rise above the top of the bar screen assembly. The dead plates 126 are made from a durable, corrosion resistant material, e.g., stainless steel.

A continuous conveyor belt 140 extends along the height of the frame 120 and is formed by interconnected links 142 forming a pair of laterally spaced, endless loops. One side/leg of each loop defines an inner run 140a extending adjacent and directly upstream of the bar screen assembly 110. Pins 146 interconnect the links 142 and allow for pivotal/articulating movement between the links. It should be noted that the links 142 forming the conveyor 140 can be conventional and are arranged so that two interconnected links can only pivot to one side relative to each other.

The conveyor 140 is driven by a conventional electric motor 480 such that the inner run 140a moves upwardly as generally indicated at A in FIG. 1A. In other words, the conveyor 140 is driven in a counterclockwise manner as shown in FIG. 1A.

Figure 2:
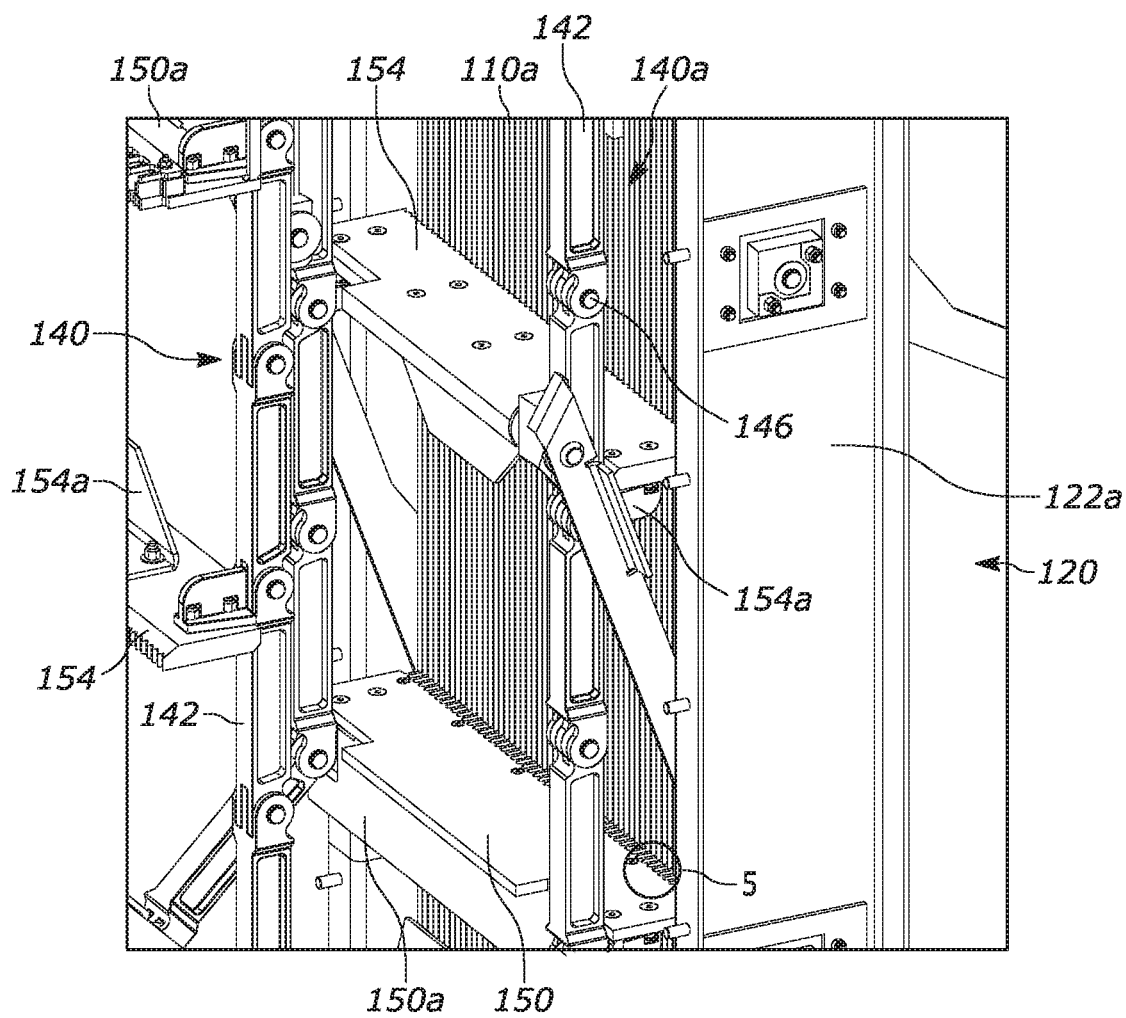
FIG. 2 is an enlarged view of a portion of the bar screen machine of FIG. 1A.

Referring also to FIG. 2, the conveyor 140 carries a plurality of spaced-apart rake plates 150 and scraper plates 154 that can be arranged to alternate with one another along each loop. Each of the rake plates 150 and scraper plates 154 is secured to both endless loops to span the lateral gap therebetween. More specifically, each rake plate 150 attached to a bracket 150a carried by the conveyor 140. Each scraper plate 154 is similarly attached to a bracket 154a also carried by the conveyor 140.

The rake plates 150 are made from a durable material, e.g., stainless steel, and the scraper plates 154 are made from a durable, corrosion-resistant material, such as a polymer, e.g., UHMWPE. Both sets of plates 150, 154 engage the bar screen assembly 110 to thereby remove any debris or trash on/between the filter bars 110a. The debris captured and engaged by the rake plate 150 and scraper plate 154 moves upwardly in the direction A and is dumped into a discharge chute 155 (see FIG. 1A) leading to a conventional trash receptacle (not shown).

Figure 3B:
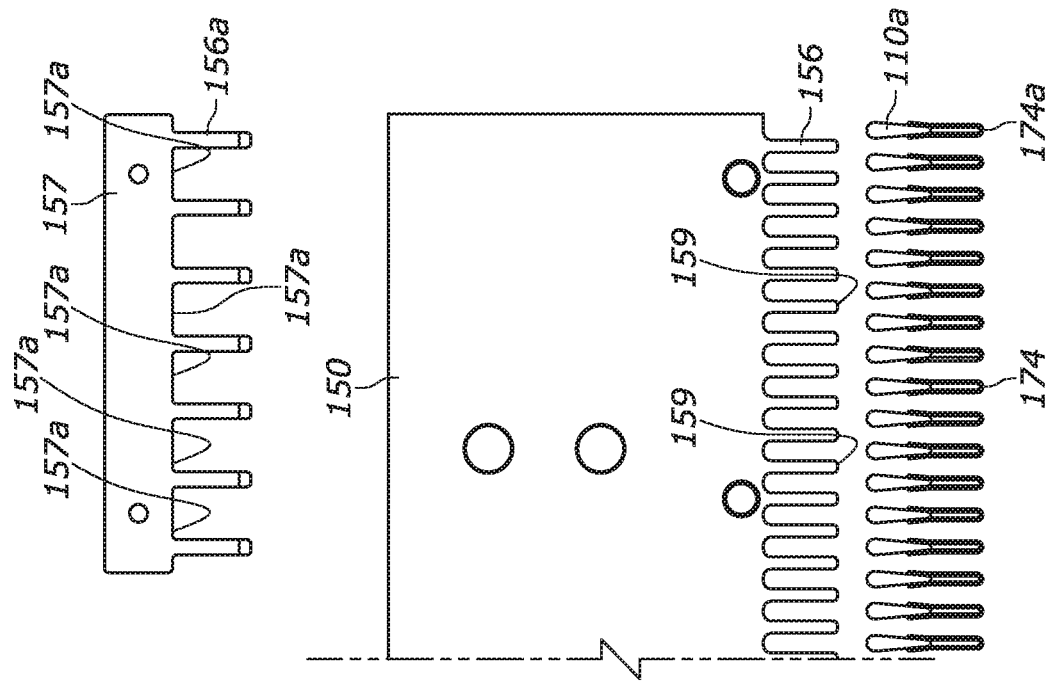
FIG. 3B is an exploded view of the rake plate of FIG. 3A.
Figure 3A:
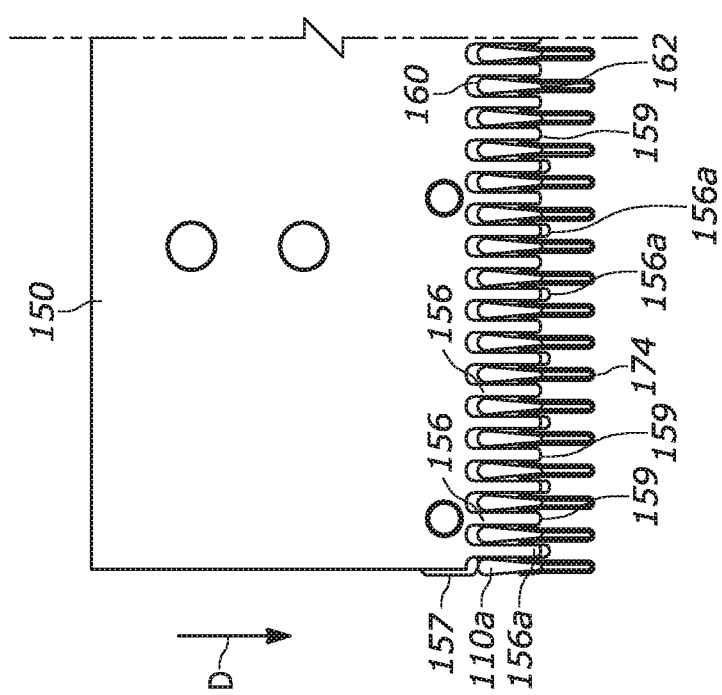
FIG. 3A is a top view of a rake plate of a bar screen cleaning apparatus.

FIGS. 3A-3B illustrate an example construction of the rake plate 150. The rake plate 150 can have a generally rectangular shape and includes a plurality of spaced-apart tines 156. The spacing between the tines 156 corresponds with the spacing between the filter bars 110a. In other words, the tines 156 are configured to interdigitate with the filter bars 110a. An additional plate 157 is secured to the rake plate 150 and includes tines 156a having the same spacing as the tines 156 and overlapping the same. The tines 156a are longer than that tines 156, i.e., extend further away from the plate 157. A bearing surface 157a is defined between adjacent pairs of tines 156a.

The plates 157 and, thus, the tines 156a are constructed of a "softer" material, e.g., a polymer material, compared to the material of the rake plate 150. As a result, when the scraper plate 154 exits the top of the bar screen assembly 110 and begins riding against the dead plate 126, the longer, softer tines 156a contact the surface of the dead plates 126 instead of the shorter, but harder, rake tines 156. This reduces the chance of galling the dead plate 126 as the rake plate 150 moves upwardly in the direction A.

Figure 4:
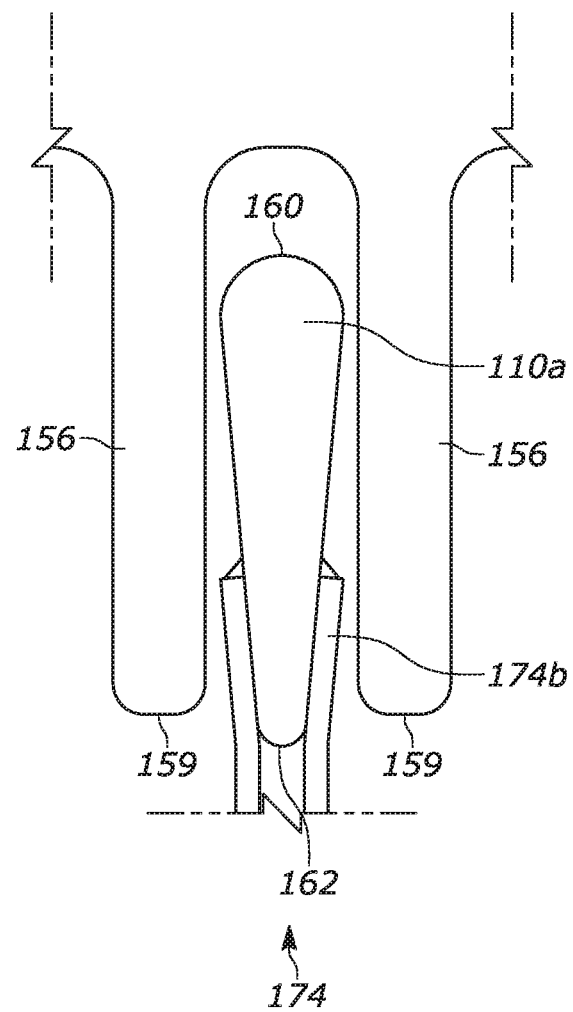
FIG. 4 is an enlarged view of a portion of FIG. 3A.

The tines 156 of the rake plate 150 extend from a leading edge 160 to a trailing edge 162 of each associated filter bar 110a. More specifically, tips 159 of the rake tines 156 extend at least to the trailing edge 162 of the filter bars 110a (see also FIG. 4). Consequently, as the rake plate 150 moves upwards across the filter bars 110a, the tips 159 of the rake tines 156 are at least substantially flush with the trailing edge 162. In one example, the tips 159 extend beyond/downstream of the trailing edge 162 of the filter bars 110a. At the same time, the longer, polymer rake tines 156a extend further beyond the trailing edges 162 of the filter bars 110a than the tips 159 extend.

The bearing surfaces 157a ride atop or slidingly engage the leading edge 160 of the filter bars 110a. With this configuration, steel-to-steel contact between the rake plate and the upstream edges of the bars is inhibited. As the bearing surface 157a wears, the rake plate 150 moves downwardly (as viewed in FIG. 3B), thus causing the stainless steel tines 156 to move deeper with respect to the filter bars 110a. In normal operation, the tips 159 of the tines 156 will eventually extend beyond the trailing edge 162 of the filter bars 110a (not shown). When the machine is assembled, the tines 156 will extend such that the tips 159 of the tines 156 are substantially flush with the trailing edge 162 of the filter bars 110a. In this manner, the tines 156 are interdigitated with the filter bars 110a. Over time, however, the tines 156 will penetrate further between the filter bars 110a and, in most instances, the tips 159 of the tines 156 will eventually extend beyond the trailing edges 162 of the filter bars 110a.

Figure 5:
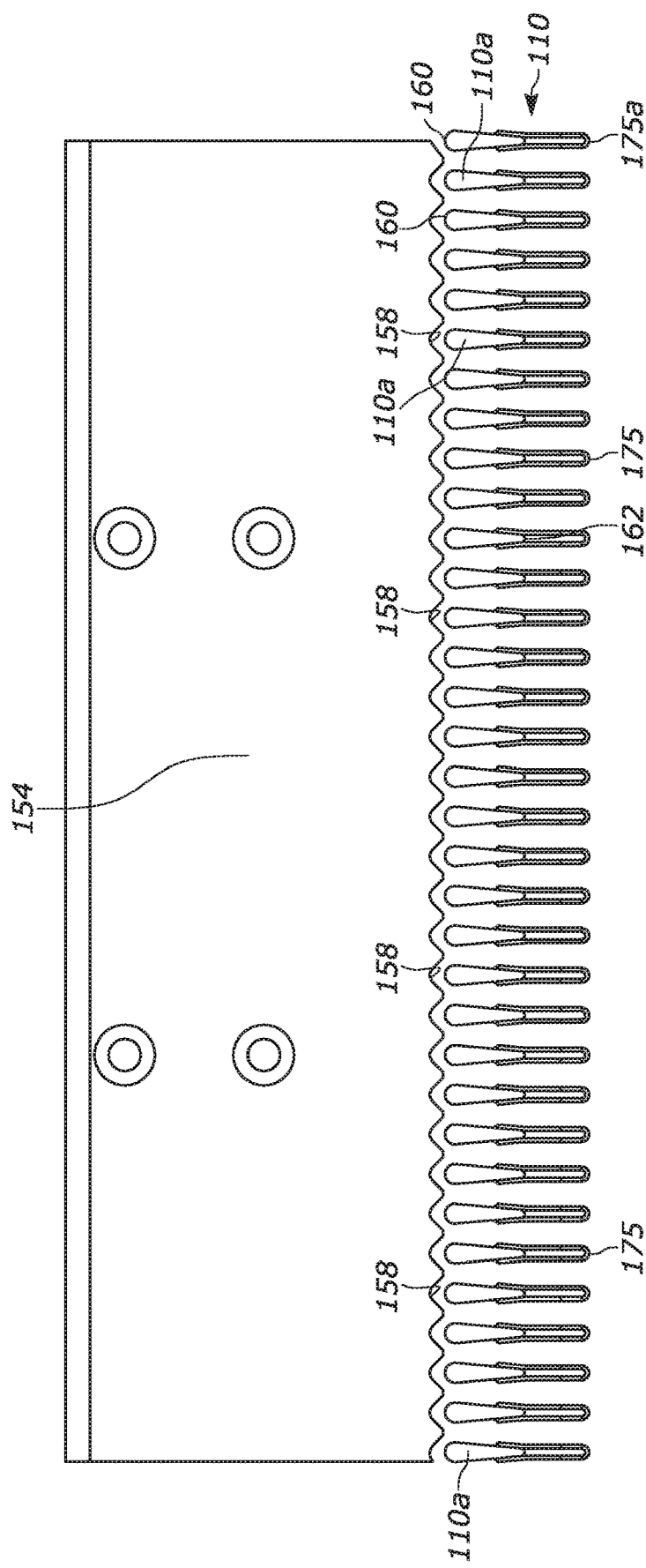
FIG. 5 is a top view of a scraper plate of the bar screen cleaning apparatus.

As seen in FIG. 5, the scraper plate 154 is generally rectangular in shape and includes notches 158 configured to conform tightly with the top or upstream surface of the filter bars 110a. In other words, the profile of the notches 158 preferably matches or mirrors the profile of the upstream/leading edge 160 of the filter bars 110a.

As shown in FIGS. 6A-6D, the filter bars 110a are mounted to the frame 120 using clips or saddles which space the trailing edges 162 of the filter bars 110a from any cross members or cross pieces that would otherwise interfere with movement of the tines 156 along the bar screen assembly 110. For instance, each individual filter bar 110a is mounted to upper, middle, and lower formed channels 168, 170, 172 using respective upper, middle, and lower mounting clips 174, 175, 176. The channels 168, 170, 172 are secured to the frame members 120a by, for example, welding. The mounting clips 174, 175, 176 can be fastened to the filter bars 110a by welding or by a separate fastener. A more detailed description of the clips 174, 176 can be found in U.S. 2020/0149239, the entirety of which is incorporated by reference herein. The clips 175 can be identical to the clips 174, 176.

Each clip 174, 175, 176 is preferably made from sheet metal bent into a general U-shape. U-shaped bottom sections 174a, 175a, 176a (see also FIGS. 3A-5) of the clips 174, 175, 176 are received in complementally shaped slots formed in the associated channel 168, 170, 172. An upper section (example shown at 174b in FIG. 4) of each clip 174, 175, 176 includes a bent, a generally V-shaped section adapted to receive the trailing edge 162 of each filter bar 110a and is suitably fastened thereto, e.g., either by welding or separate fasteners. The clips 174, 175, 176 cooperate with the channels 168, 170, 172 and filter bars 110a such that the trailing edges 162 of the filter bars are spaced away from the channels to provide clearance for the tines 156 of the rake plate 150. As a result, the tines 156 can extend from the leading edge 160 to the trailing edge 162 [and beyond] of each filter bar 110a. This enables debris lodged anywhere along the side surface of the filter bars 110a to be removed by the rake plate 150.

Figure 6A:
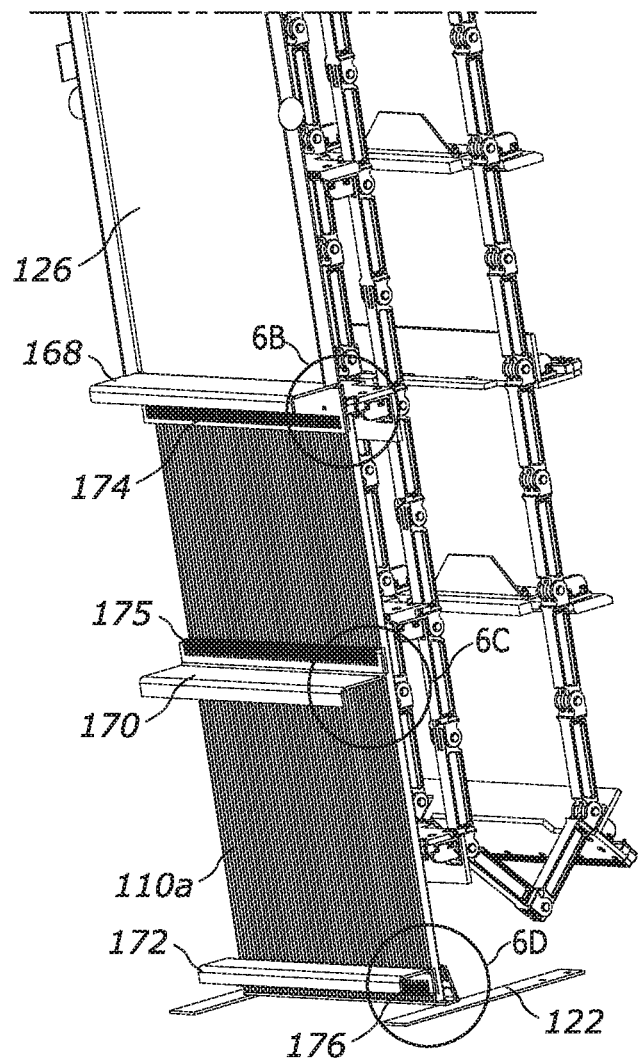
FIG. 6A is a rear view of a portion of the bar screen assembly.
Figure 6B:
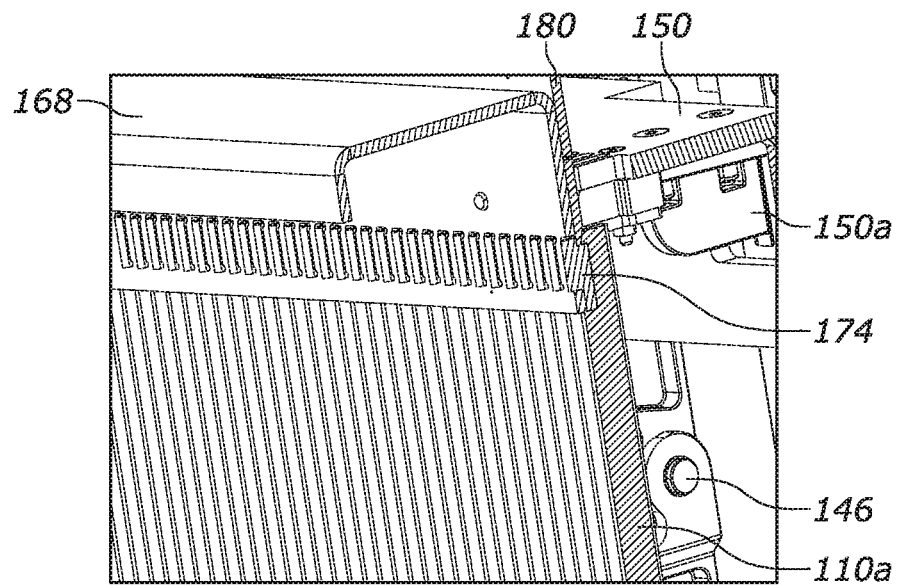
FIGS. 6B-6D are enlarged views of portions of FIG. 6A.
Figure 6C:
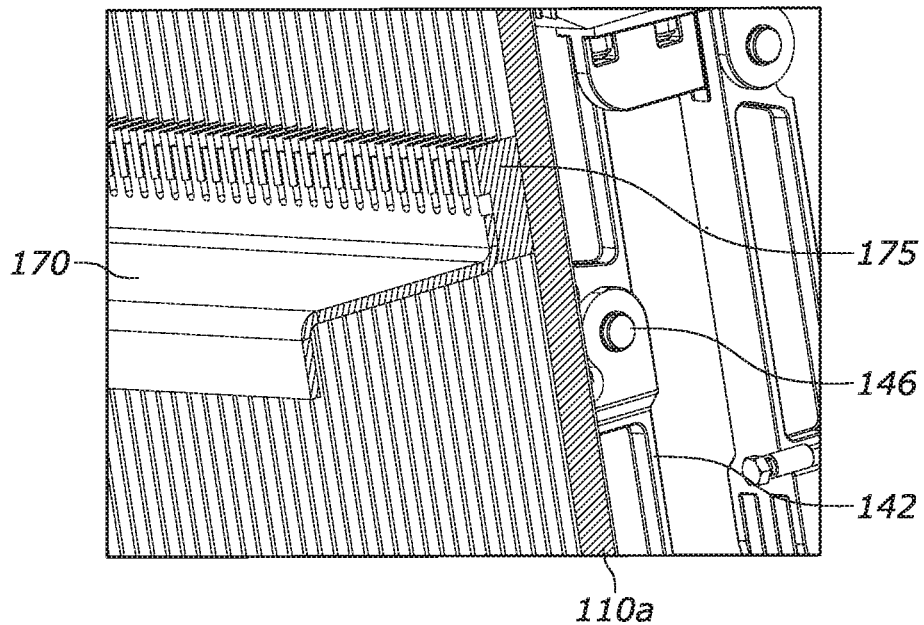
Figure 6D:
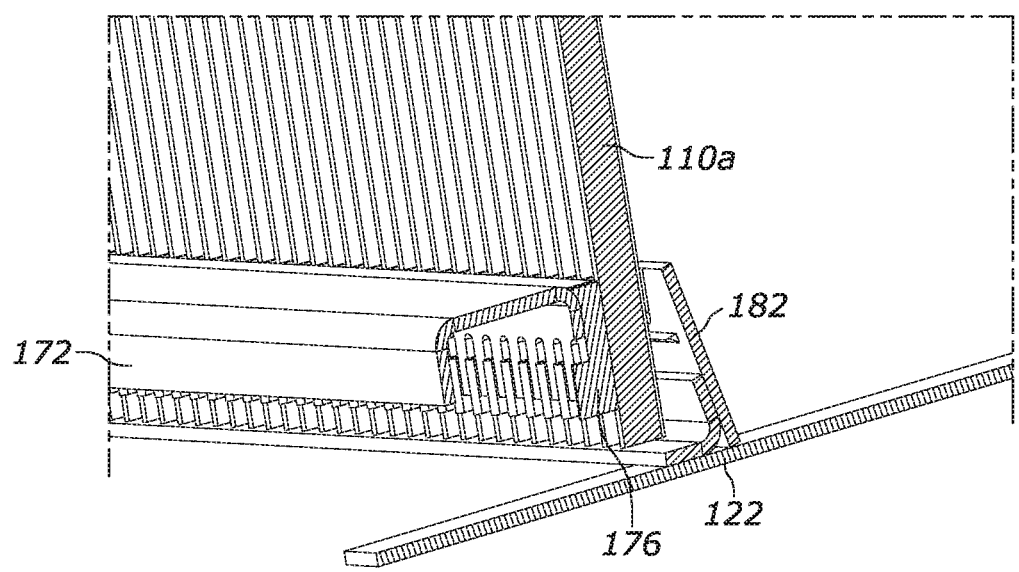

Referring to FIG. 6B, the upper ends of the filter bars 110a are clamped to the associated channel 168 by a removable clamping plate 180. The clamping plate 180 engages the clips 174 holding the upper ends of the filter bars 110a to prevent the clips 174 from moving out of the slots in the channel 168.

The lower ends (FIG. 6D) of the filter bars 110a are held to the lower channel 172 by a removable clamping plate 182 that pins the lower ends between the clamping plate 182 and the clips 176. Due to this construction the filter bars 110a are rigidly held by the associated channels 168, 170, 172 but can also be easily replaced.

Figure 7:
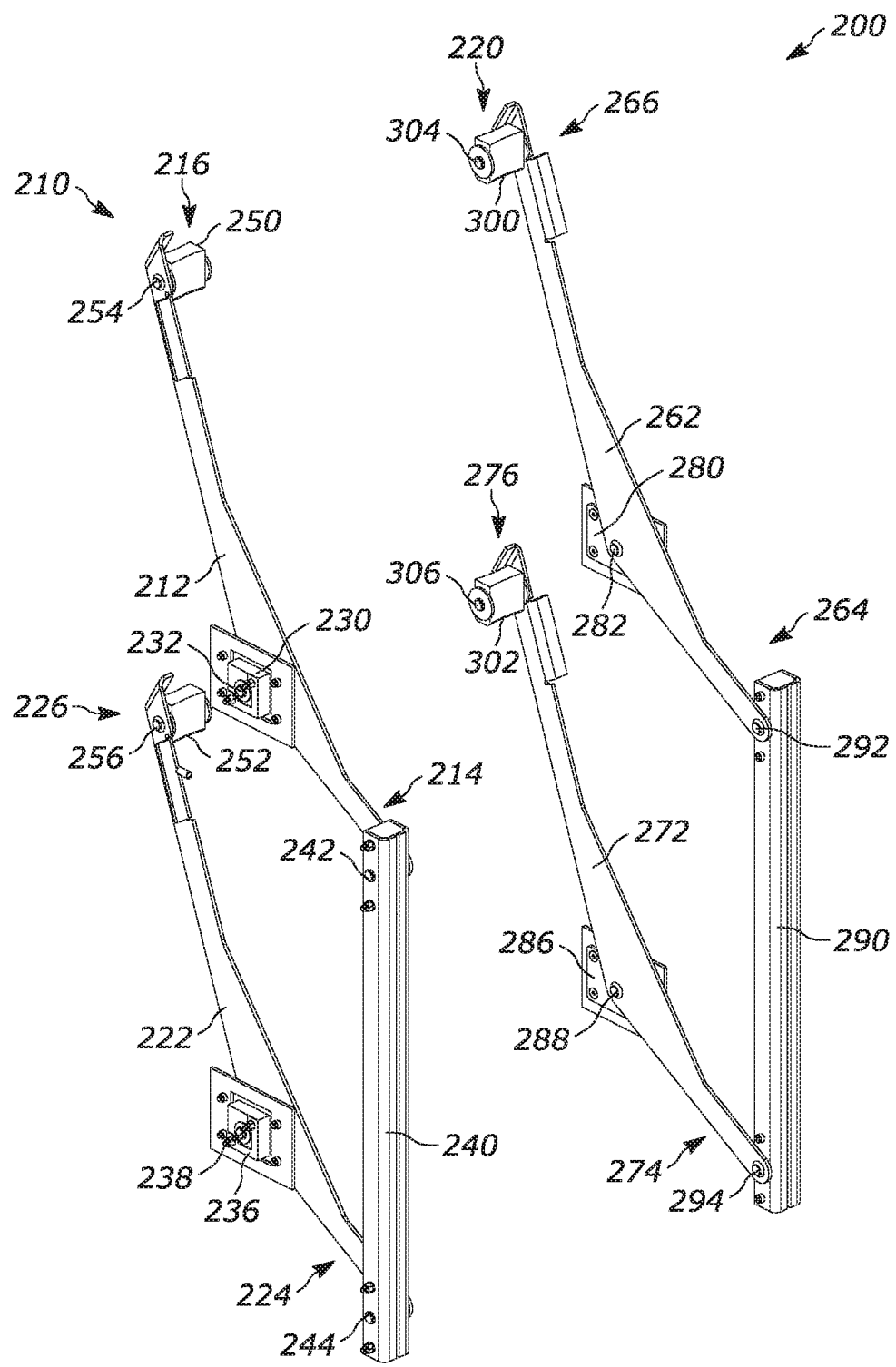
FIG. 7 is a schematic illustration of a belt retaining system.
Figure 8:
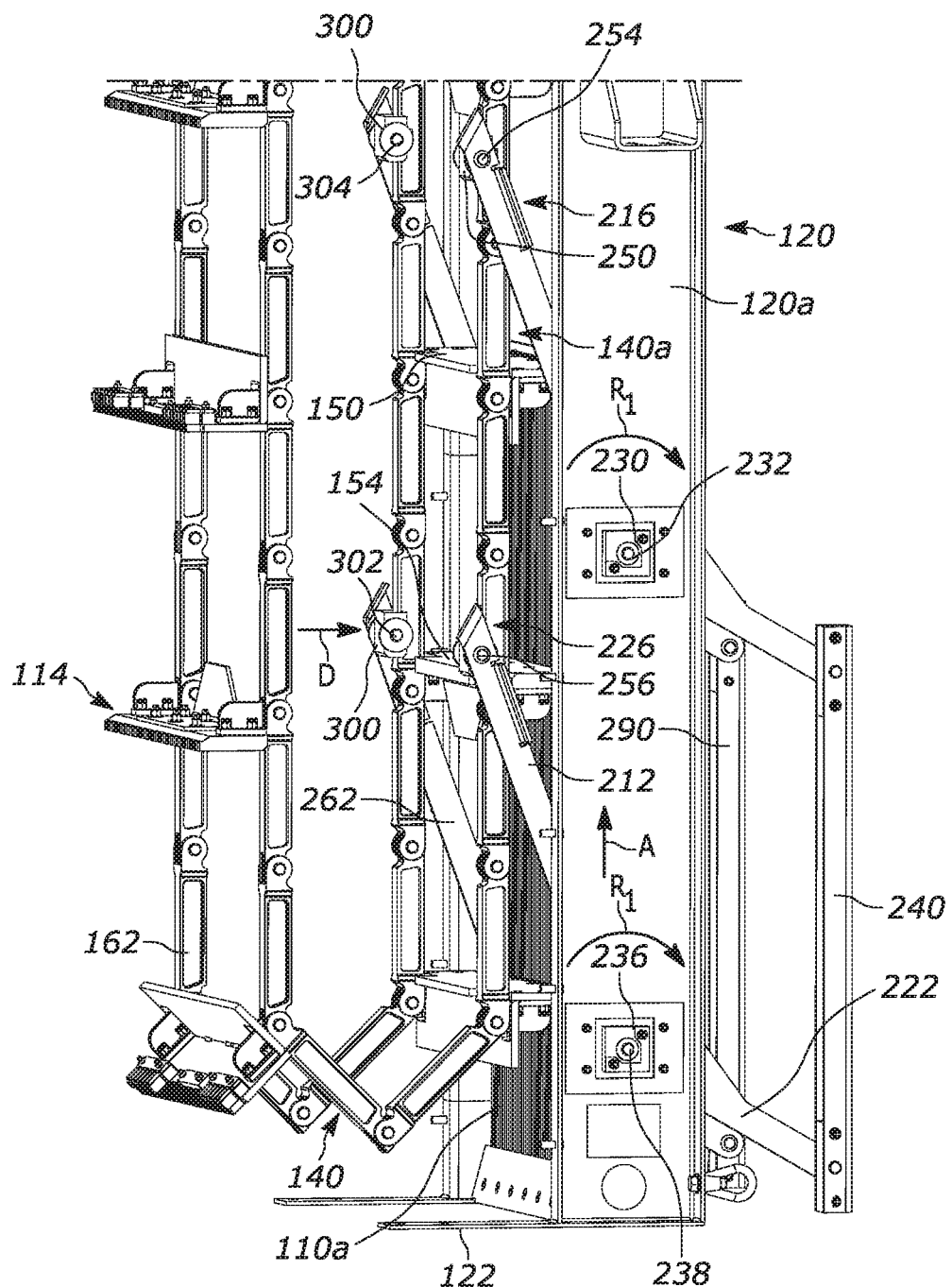
FIG. 8 is a side view of the belt retaining system with the bar screen cleaning apparatus.

As shown in FIGS. 7-8, the machine 100 further includes a conveyor belt retaining system or mechanism 200 for maintaining the inner run 140a of the conveyor 140 in close proximity with the filter bars 110a. More specifically, the mechanism 200 helps pull the inner run 140a of the conveyor 140 towards the filter bars 110a such that the rake plates 150 and scraper plates 154 maintain interdigitation with the filter bars regardless of the angle α between the frame members 120a and the feet 122. The mechanism 200 therefore helps to provide the restoring force on the conveyor 140 normally provided by gravity when the frame 120 extends at a non-perpendicular or relatively shallower angle α relative to the feet 122.

With this in mind, the mechanism 200 includes a pair of subassemblies 210, 220—one on each side of the conveyor 140. The subassembly 210 includes a first or upper arm 212 and a second or lower arm 222. The arms 212, 222 are made from a corrosion-resistant material, such as stainless steel. The first arm 212 extends from a first end 214 to a second end 216. The second arm 222 extends from a first end 224 to a second end 226.

A bearing mount 230 is pivotally secured to the first arm 212 between its ends 214, 216 by a pin 232. A bearing mount 236 is pivotally secured to the second arm 222 between its ends 224, 226 by a pin 238. The first end 214 of the arm 212 includes a guide 250 formed from a durable, corrosion-resistant material, such as a polymer, e.g., UHMWPE. A pin 254 connects the guide 250 to the arm 212 to allow for relative pivotal movement therebetween. Similarly, the first end 224 of the arm 222 includes a guide 252 formed from a durable, corrosion-resistant material, such as a polymer, e.g., UHMWPE. A pin 256 connects the guide 252 to the arm 222 to allow for relative pivotal movement therebetween.

A counterweight 240 is secured to the second ends 214, 224 of the arms 212, 222 by respective pins 242, 244. The counterweight 240 is formed from a corrosion-resistant material, such as stainless steel. The pins 242, 244 allow the arms 212, 222 to pivot relative to the counterweight 240.

The bearing mounts 230, 236 are secured to one of the frame members 120a such that the first ends 214, 224 of the arms 212, 222 are upstream of the filter bars 110a and the counterweight 240 is downstream of the filter bars (see FIG. 8). The pins 232, 238 allow the arms 212, 222 to pivot relative to the frame member 120a secured thereto.

The subassembly 220 has the same construction as the subassembly 210. In the interest of brevity, features in the subassembly 220 have reference numbers 50 greater than the corresponding features in the subassembly 210. That the, the bearing guides 280, 286 on the subassembly 220 are secured to the other frame member 120a opposite the subassembly 210 such that subassemblies 210, 220 are symmetrically disposed on opposite sides of the filter bars 110a.

To this end, both counterweights 240, 290 are downstream of the filter bars 110a and the guides 250, 252, 300, 302 are upstream of the filter bars. More specifically, the guides 250, 252, 300, 302 are positioned upstream of the inner run 140a of the conveyor 140 and engage the upstream side thereof. It will be appreciated that the guides 250, 300 can be formed as a single, unitary piece spanning the width of the inner run 140a (not shown) and/or that the guides 252, 302 can be formed as a single, unitary piece spanning the width of the inner run (also not shown). The counterweights 240, 290 could be formed together as a single unit (not shown). Regardless, the counterweights 240, 290—whether separate or formed together—act in concert as one collective counterweight. Moreover, either the top arms 212, 262 (and associated guides 250, 300) or the bottom arms 222, 272 (and associated guides 252, 302) can be omitted (not shown).

In the configuration shown, the counterweights 240, 290 urge the arms 212, 222, 262, 272 to rotate about the respective pins 232, 238, 282, 288 in the manner indicated generally at $R_1$ in FIG. 8. In this manner, the counterweights 240, 290 provide a biasing force on the guides 250, 252, 300, 302 in the downstream direction D, thereby biasing the inner run 140a in the downstream direction towards the filter bars 110a. As a result, the tines 156 on the rake plates 150 and the notches 158 on the scraper plates 154 maintain interdigitation with the filter bars 110a.

Figure 9:
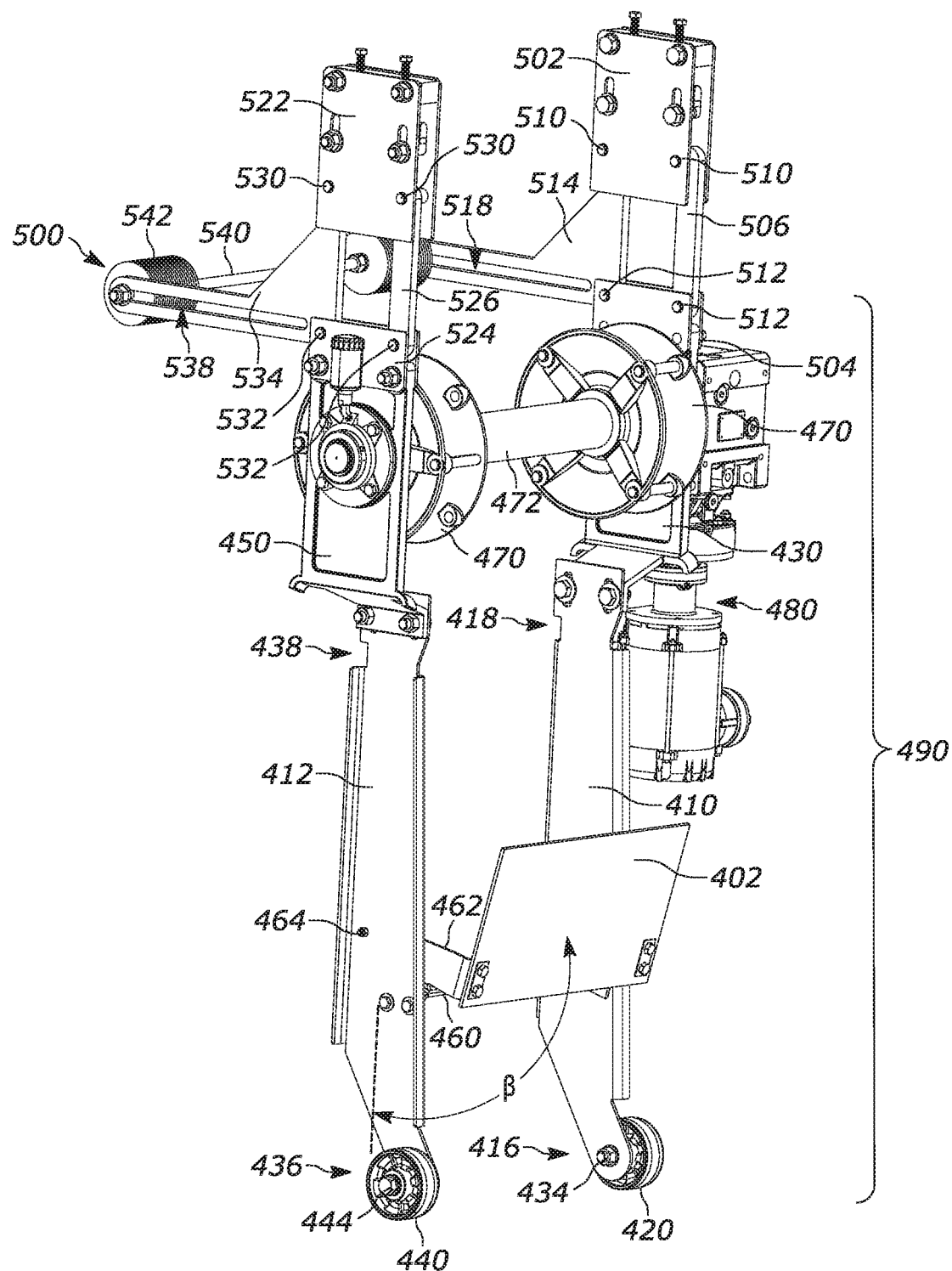
FIG. 9 is a schematic illustration of a stabilizing device of the bar screen machine.

Referring to FIG. 9, the machine 100 further includes a first arm 410 and a second arm 412. The arms 410, 412 are made from a corrosion-resistant material, such as stainless steel. The first arm 410 extends from a first end 416 to a second end 418. A guide wheel 420 is secured to the first end 416 by a pin 434 that allows the guide wheel to rotate relative to the first arm 410. A drive mounting plate 430 is secured to the second end 418.

The second arm 412 extends from a first end 436 to a second end 438. A guide wheel 440 is secured to the first end 436 by a pin 444 that allows the guide wheel to rotate relative to the second arm 412. Alternatively, a single guide wheel (not shown) can span the width between the arms 410, 412 and be rotatably connected thereto by the pins 434, 444 (not shown).

Figure 10:
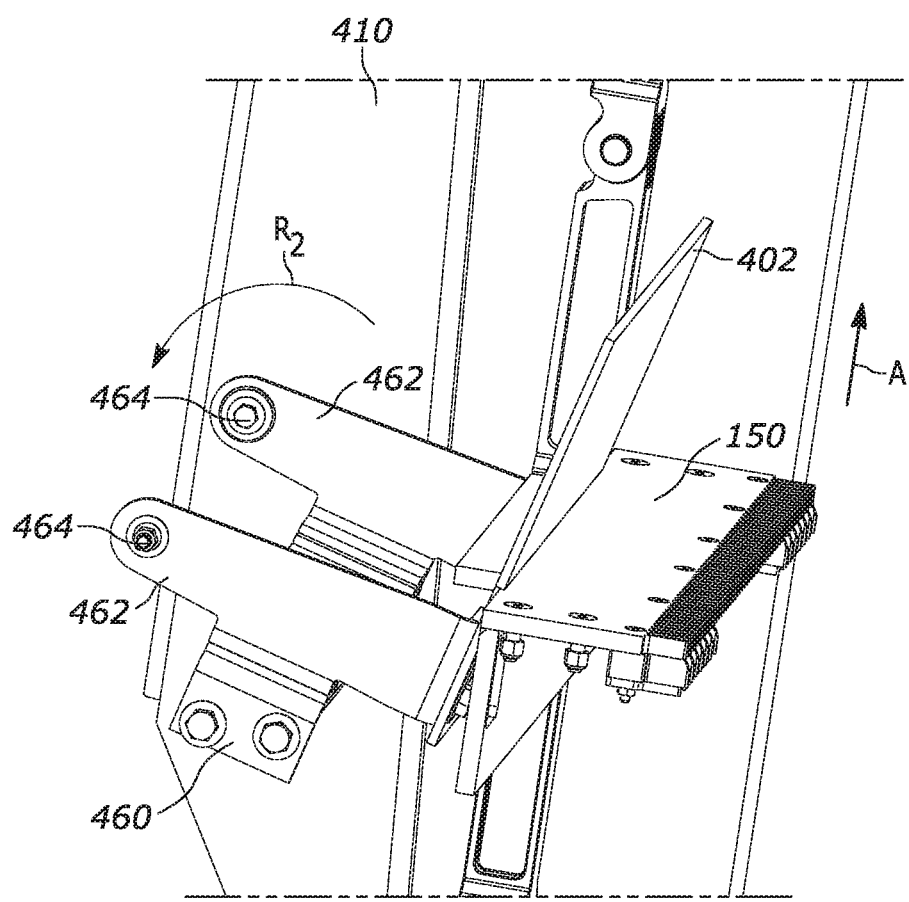
FIG. 10 is an enlarged view of a deflection plate during operation of the bar screen machine.

In any case, a drive mounting plate 450 is secured to the second end 438. A connecting bracket 460 (see also FIG. 10) is secured to both arms 410, 412 between the respective ends 416, 418 and 436, 438 thereof such that the arms extend generally parallel to one another, the pins 434, 444 are coaxial, and the drive mounting plates 430, 450 are laterally aligned.

A pair of arms 462 are pivotally connected to the pivot arms 410, 412 via pins 464 such that the arms 462 extend in the downstream direction D between the pivot arms 410, 412 and above the connecting bracket 460. The arms 462 are rigidly secured to a deflection plate 402. In a resting/first position, the arms 462 rest on the connecting bracket 460 such that the deflection plate 402 extends at an angle β relative to the longitudinal centerline of the arms 410, 412. The arms 462 and, thus, the deflection plate 402 are pivotable about the pins 464 in the manner $R_2$ away from the connecting bracket 460.

Returning to FIG. 9, a pulley 470 is rotatably connected to each drive mounting plate 430, 450. A shaft 472 rotatably connects the pulleys 470 to one another. This connects the arms 410, 412, guide wheels 420, 440, mounting plates 430, 450, pulleys 470, and shaft 472 together as a single unit identified at 490. The motor 480 is secured to the drive mounting plate 430 (or the drive mounting plate 450 for opposite drive-side mounting (not shown)) and operatably connected to the shaft 472 such that actuation of the motor rotates the shaft to, in turn, rotate the pulleys 470. The loops of the conveyor 140 extend around the pulleys 470 such that the motor 480 controls movement of the conveyor relative to the filter bars 110a.

A stabilizing device 500 is provided and includes a series of brackets 502, 504, 506 for connecting the drive mounting plate 430 to the frame 120. In particular, the bracket 504 is fixed to the drive mounting plate 430. The bracket 502 is fixed to the frame 120. The bracket 506 is pivotally connected to the bracket 502 by a pin 510 and pivotally connected to the bracket 504 by a pin 512. A swing arm 514 is pivotally connected to the brackets 502, 504 by respective pins 510, 512. The swing arm 514 can be generally L-shaped and includes a slot 518 extending away from the bracket 506.

Similarly, a series of brackets 522, 524, 526 connects the drive mounting plate 450 to the frame 120. In particular, the bracket 524 is fixed to the drive mounting plate 450. The bracket 522 is fixed to the frame 120. The bracket 526 is pivotally connected to the bracket 522 by a pin 530 and pivotally connected to the bracket 524 by a pin 532. A swing arm 534 is pivotally connected to the brackets 522, 524 by respective pins 530, 532. The swing arm 534 can be generally L-shaped and includes a slot 538 extending away from the bracket 526.

A shaft 540 extends through the slots 518, 538 in the swing arms 514, 534. One or more counterweights 542 are secured to the shaft 540 for inducing a moment on the swing arms 514, 534 about the pins 510, 512, 530, 532. The position of the shaft 540 within the slots 518, 538 can be adjusted to vary the moment provided by the counterweight 542, i.e., the moment decreases as the shaft (and therefore the counterweight 542) move closer to the pins 510, 512, 530, 532.

Figure 11:
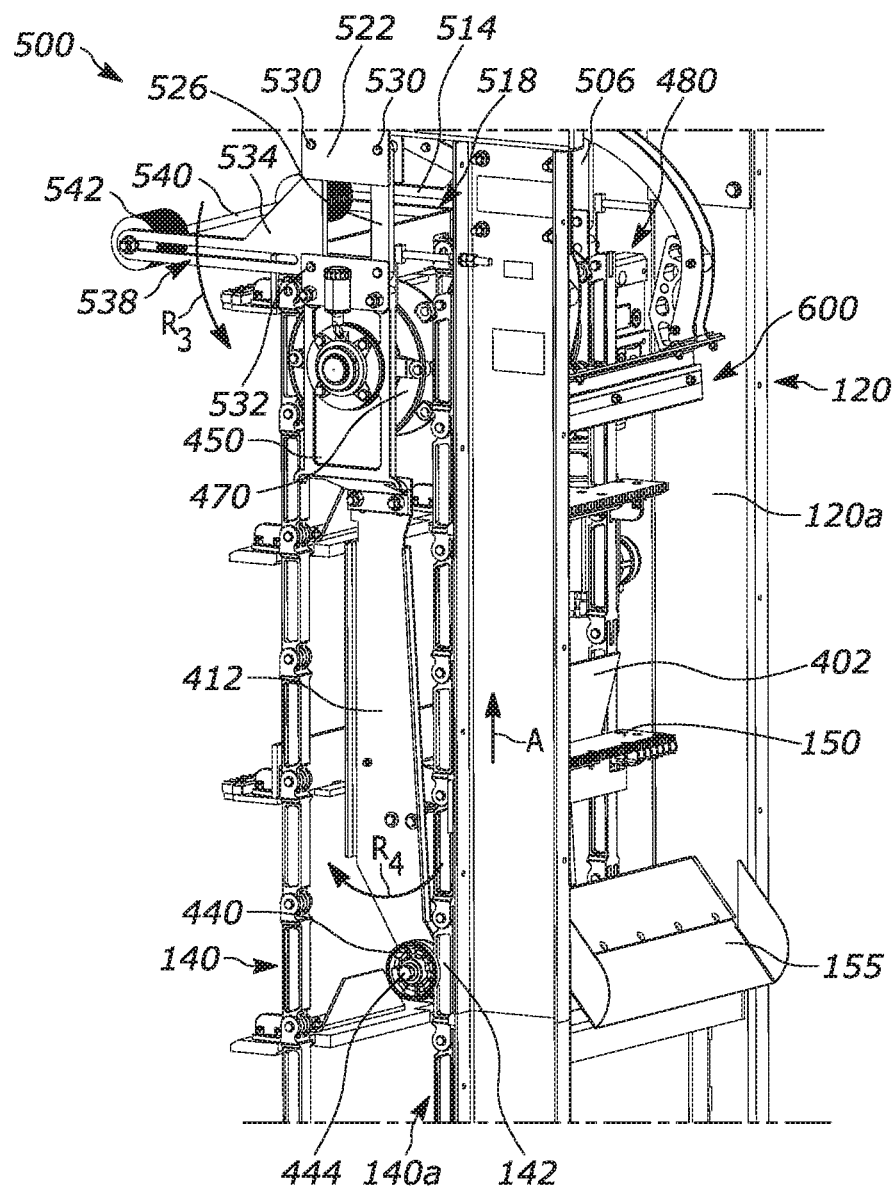
FIG. 11 is a side view of the stabilizing device of FIG. 9 on the bar screen machine.

In any case, when the stabilizing device 500 is connected to the frame 120 as shown in FIG. 11, the guide wheels 420, 440 abut the upstream side of the inner run 140$a$ of the conveyor 140 at a height that can be generally aligned with the discharge chute 155. The counterweight 542 is located upstream of the pins 510, 512, 530, 532 and therefore biased in the direction $R_3$ to move the swing arms 514, 534 into engagement with the respective drive mounting plates 430, 450. This causes the entire unit 490 to pivot in the direction $R_3$ about the pins 512, 532. As one consequence, the shaft 472 and pulleys 470 are biased in the direction $R_3$ towards the inner run 140$a$ and frame 120.

At the same time, the guide wheels 420, 440 are also biased in the direction $R_3$ to urge/push the inner run 140$a$ towards the frame 120. In this manner, the counterweight 542 and unit 490 cooperate to act as another belt retaining system that biases the inner run 140$a$ of the conveyor 140 towards the filter bars 110$a$ while biasing the shaft 472 and pulleys 470 towards the frame 120. That the, the guide wheels 420, 440 function similarly to the guides 250, 252 and the counterweight 542 functions similarly to the counterweight 240.

Regardless, the biased shaft 472, pulleys 470, and guide wheels 420, 440 help to maintain the portion of the inner run 140$a$ above the filter bars 110$a$ towards the frame 120. In other words, the middle and upper portions of the inner run 140$a$ are maintained in close proximity to the frame 120 (in the upstream-downstream direction D) while the belt retaining system 200 biases the lower portion of the inner run in the same manner.

In operation, and referring to FIG. 1A, incoming water 30 to be treated flows in the downstream direction D towards the bar screen machine 100. The motor 480 is actuated to drive the shaft 472 and advance the conveyor 140 in the counterclockwise direction (as shown) to move the rake plates 150 and scraper plates 154 on the inner run 140$a$ in the upward direction A.

Debris or other unwanted solid material M entrained in the water 30 flows into engagement with the filter bars 110$a$, which are spaced apart a predetermined distance to prevent material over a specified size from flowing downstream of the machine 100. The debris M is collected by the moving rake plates 150 and travels in the direction A upwards towards the discharge chute 155. The scrape plates 154 follow the rake plates 150 and scrape/clean the upstream side of the filter bars 110$a$ to help prevent clogging.

The rake plate 150 carrying the debris M reaches the deflection plate 402, which automatically pushes the debris towards the tines 156. To this end, as the collected debris M reaches the deflection plate 402, the deflection plate has an initial/resting condition engaging the connecting bracket 460 and aligned with the rear or upstream side of the rake plate 150 carrying the debris. More specifically, the deflection plate 402 initially extends over at least a portion of the approaching rake plate 150 such that the deflection plate engages the upward moving rake plate.

As the rake plate 150 moves further in the direction A, the deflection plate 402 helps push the material M towards the tines 156. At the same time, the deflection plate 402 is urged by the rake plate 150 away from the dead plates 126 so as to pivot in the manner $R_2$ (see FIG. 10) upstream to a retracted condition spaced from the connecting bracket 460, i.e., increasing the angle β. Once the rake plate 150 moves past/out of contact with the deflection plate 402, the weight of the deflection plate 402 causes it to automatically pivot back into the initial condition engaging the connecting bracket 460 and awaiting the next rake plate 150.

A conventional wiper assembly 600 pivotally connected to the frame 120 moves from an initial position to push the debris M off the rake plate 150 into the discharge chute 155. The wiper assembly 600 and deflection plate 402 return to their initial positions before/as the next scraper plate 154 moves past the wiper assembly. The process repeats for each subsequent rake plate 150 and scraper plate 154. In particular, the deflection plate 402 returns to the initial position just prior to the wiping assembly 600 contacting and completing cleaning the rake plate 150 by scraping the debris M into the discharge chute 155. The deflection plate 402 therefore advantageously helps to remove the debris M from the rake plates 150 while automatically moving into and out of the way of the upwardly moving rake plates 150.

Periodically, the material M can become lodged between the tines 156 and the filter bars 110$a$. This urges the rake plate 150 engaging the material outward and away from the filter bars 110$a$. Consequently, the portion of the inner run 140$a$ connected to that rake plate 150 is urged away from the filter bars 110$a$. This biasing force would normally be counteracted by the weight of the conveyor 140 when the angle α is comparatively shallower, e.g., less than about 80°. As noted, however, the angle α in this example is comparatively steeper, e.g., greater than 80° up to 90° or substantially 90°. That said, the counterweights 240, 290 advantageously provide a counteracting force on the inner run 140$a$ to help maintain interdigitation between the tines 156 and the filter bars 110$a$ when the material M is below a predetermined size.

When the debris M exceeds a predetermined size, however, the outward force on the rake plate 150 and inner run 140$a$ overcomes the biasing moment of the counterweights 240, 290. As a result, the lower portion of the inner run 140$a$ adjacent the debris M moves away from the filter bars 110$a$. More specifically, the rake plate 150 carrying the debris M pushes upstream on the links 142 secured thereto, causing the guides 250, 252, 300, 302 to likewise move upstream.

This causes the arms 212, 222, 262, 272 to pivot about the pins 232, 238, 282, 288 in a direction opposite the direction $R_1$. In other words, the upstream force of the rake plate 150/inner run 140a overcomes the bias/moment of the counterweights 240, 290. Consequently, the inner run 140a moves away from the filter bars 110a to allow the rake plate 150 to more adequately engage and lift the oversized debris M.

As the oversized debris M moves upward in the direction A, eventually the upstream force applied to the arms 212, 222, 262, 272 is reduced to the point that the counterweights 240, 290 automatically pivot the arms in the direction $R_1$, thereby returning the lower portion of the inner run 140a to the initial position with the rake plate 150 tines 156 interdigitated with the filter bars 110a.

During pivotal movement of the arms 212, 222, 262, 272, the counterweight 542 on the swing arms 514, 534 helps to maintain the guide wheels 420, 440 engaged with the inner run 140a and urging the same towards the dead plates 126. This advantageously helps to maintain the rake plates 150 above the belt retaining system 200 in close proximity with the dead plates 126 to help prevent the collected debris M from falling off the rake plates back into the channel 20.

In other words, the biased guide wheels 420, 440 help prevent the inner run 140a more specifically the middle/upper portions thereof—from moving far enough away from the dead plates 126 and filter bars 110a that the collected debris M can fall off the rake plates 150.

Furthermore, the guide wheels 420, 440 (via the counterweight 542) hold the upper portion of the inner run 140a in position before, during, and after any movement of the lower portion of the inner run by the belt retaining system 200 to help ensure collected debris M reaches the deflection plate 402 and ultimately the discharge chute 155. That said, the stabilizing device 500 advantageously helps to simultaneously bias the guide wheels 420, 440, the pulleys 470, and the shaft 472 in the downstream direction D in order to help ensure debris M reaches the discharge chute 155 even when the inner run 140a is retracted away from the filter bars 110a.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A bar screen assembly for removing debris from water flowing through a channel, comprising:
   a plurality of elongate, spaced apart, parallel filter bars;
   a continuous conveyor including:
      a frame;
      a pair of spaced apart endless link loops movably mounted on the frame;
      a plurality of rakes extending between and connected to each of the endless link loops, each rake including a plurality of spaced apart tines interdigitated with the parallel filter bars, where, as each rake is moved along the parallel filter bars by the endless link loops, it is capable of removing debris from the parallel filter bars;
      a drive mechanism for moving the pair of endless link loops about the frame, is connected to the endless link loops;
      an endless link loop retaining system including:
         a first guide capable of biasingly engaging an upstream side of an inner run of one of said endless link loops;
         a first arm pivotally attached to the frame and having an end connected to the first guide;
         a second guide capable of biasingly engaging the upstream side of the same endless link loop to be engaged by the first guide;
         a second arm pivotally attached to the frame and having an end connected to the second guide; and
         a first counterweight connected to another portion of each arm and capable of causing the first and second guides to biasingly engage the inner run in a downstream direction.

2. The bar screen assembly of claim 1, wherein the endless link loop retaining system additionally includes:
   a third guide capable of biasingly engaging an upstream side of an inner run of the other of said endless link loops;
   a third arm pivotally attached to the frame and having an end connected to the third guide;
   a fourth guide capable of biasingly engaging the upstream side of the same endless link loop to be engaged by the third guide;
   a fourth arm pivotally attached to the frame and having an end connected to the fourth guide; and
   a second counterweight connected to another portion of each third and fourth arm and capable of causing the third and fourth guides to biasingly engage the inner run of the other of said endless link loops in a downstream direction.

3. The bar screen assembly of claim 2, wherein the first and second counterweights are positioned downstream of the continuous conveyor.

4. The bar screen assembly of claim 2, wherein the first and second counterweights are connected to the end of their respective arms at an end opposite to the arm end where each respective guide is connected.

5. The bar screen assembly of claim 1, wherein the drive mechanism includes a motor.

6. The bar screen assembly of claim 1, wherein the drive mechanism includes at least two pulleys mounted on the frame for moving the endless link loops.

7. The bar screen assembly of claim 1, wherein the drive mechanism includes at least two pulleys mounted on the frame and operably connected to a motor for moving the endless link loops.

8. The bar screen assembly of claim 1, wherein the first and second arms are capable of pivoting in a first direction in response to one of the rakes engaging an object on the parallel filter bars over a predetermined size.

9. The bar screen assembly of claim 1, wherein the parallel filter bars extend in a direction substantially perpendicular to the channel.

10. The bar screen assembly of claim 1, further comprising
    a deflection plate extending into the continuous conveyor for pushing debris on the rakes towards the tines, the deflection plate having an initial condition pivoted towards the rakes and being pivoted in an upstream direction to a retracted condition in response to upward movement of the continuous conveyor.

11. The apparatus of claim 10, wherein each rake carrying the debris moves the deflection plate to the retracted condition.

12. The apparatus of claim 11, wherein the weight of the deflection plate causes it to automatically return to the initial condition once the rake carrying the debris becomes spaced from the deflection plate.

13. The apparatus of claim 1, wherein the first guide is positioned above the filter bars.

\* \* \* \* \*